(12) United States Patent
Matsumoto et al.

(10) Patent No.: US 12,147,125 B2
(45) Date of Patent: Nov. 19, 2024

(54) LIQUID CRYSTAL PANEL AND THREE-DIMENSIONAL DISPLAY DEVICE

(71) Applicant: Sharp Display Technology Corporation, Kameyama (JP)

(72) Inventors: Hiromi Matsumoto, Kameyama (JP); Takahiro Sasaki, Kaneyama (JP); Takashi Satoh, Kameyama (JP); Akira Sakai, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/624,798

(22) Filed: Apr. 2, 2024

(65) Prior Publication Data
US 2024/0345438 A1 Oct. 17, 2024

(30) Foreign Application Priority Data

Apr. 14, 2023 (JP) ................. 2023-066508

(51) Int. Cl.
*G02F 1/1339* (2006.01)
*G02F 1/1333* (2006.01)
*G02F 1/1335* (2006.01)
*G02F 1/13363* (2006.01)

(52) U.S. Cl.
CPC ...... *G02F 1/1339* (2013.01); *G02F 1/133308* (2013.01); *G02F 1/133354* (2021.01); *G02F 1/133531* (2021.01); *G02F 1/13363* (2013.01)

(58) Field of Classification Search
None
See application file for complete search history.

(56) References Cited

U.S. PATENT DOCUMENTS

| 2017/0102574 A1* | 4/2017 | Kim ................ G02F 1/1368 |
| 2024/0210721 A1* | 6/2024 | Sasaki .............. G02F 1/1339 |
| 2024/0210777 A1* | 6/2024 | Yonebayashi ........ G02B 30/25 |

FOREIGN PATENT DOCUMENTS

JP H08211395 A 8/1996

* cited by examiner

*Primary Examiner* — Phu Vu
(74) *Attorney, Agent, or Firm* — ScienBiziP, P.C.

(57) ABSTRACT

There is provided a liquid crystal panel provided with a display region and a frame region and including a first substrate and a second substrate disposed facing the first substrate. In the display region, a liquid crystal layer is disposed between the first substrate and the second substrate. In the frame region, a sealing portion is disposed between the first substrate and the second substrate. The first substrate includes a first support substrate and a first substrate-side insulating layer contacting the first support substrate in order toward the liquid crystal layer side. The second substrate includes a protrusion protruding to the liquid crystal layer side. The first substrate-side insulating layer includes a first thickness portion having a flat surface on the liquid crystal layer side, and a second thickness portion protruding to the liquid crystal layer side relative to the first thickness portion and disposed to face the protrusion.

16 Claims, 18 Drawing Sheets

LIQUID CRYSTAL PANEL AND THREE-DIMENSIONAL DISPLAY DEVICE

CROSS-REFERENCE TO RELATED APPLICATIONS

This application claims the benefit of priority to Japanese Patent Application Number 2023-066508 filed on Apr. 14, 2023. The entire contents of the above-identified application are hereby incorporated by reference.

BACKGROUND

Technical Field

The disclosure described below relates to a liquid crystal panel and a three-dimensional display device provided with the liquid crystal panel.

An optical element such as a liquid crystal panel is used not only to display an image but also to compensate for a viewing angle or the like. As a technique related to an optical element, for example, JP 8-211395 A discloses a liquid crystal cell including a pair of electrode substrates combined via a belt-shaped seal and a liquid crystal that is sealed between the pair of electrode substrates by the seal, wherein a groove is formed on at least one of the inner surfaces of the pair of electrode substrates at a position facing the seal, and the pair of electrode substrates are combined with the seal located in the groove.

SUMMARY

In recent years, three-dimensional display devices using liquid crystal panels have been developed. As a method for three-dimensional display, there has been proposed a scheme in which, in a display device in which two liquid crystal panels are layered, an image for the left eye and an image for the right eye are alternately displayed on the liquid crystal panel on the back face side, polarization states of the respective images are controlled in the liquid crystal panel on the observation face side, and the images for the left eye and the right eye are separated and visually recognized by using polarization glasses. The liquid crystal panel on the observation face side functions as a so-called active retarder. As described above, a display device that delivers mutually different images for the left eye and right eye by time division to make depth sensation perceived is also referred to as an active retarder type three-dimensional display device.

FIG. 18 is a photograph showing display unevenness of a display device according to a comparative embodiment. The display device of the comparative embodiment includes a display liquid crystal panel and a liquid crystal panel disposed on the observation face side of the display liquid crystal panel. The liquid crystal panel disposed on the observation face side is a liquid crystal panel in which an electrically controlled birefringence (ECB) mode liquid crystal layer is interposed between a pair of substrates, and functions as an active retarder.

In the display device of the comparative embodiment, as shown in FIG. 18, white unevenness occurs in a display region near a frame region (more specifically, a display region near a sealing portion). In addition, in the display device of the comparative embodiment, as shown in FIG. 18, vertical streak unevenness occurs at a pitch of 20 to 30 mm in the display region.

In JP 8-211395 A, a technique to suppress white unevenness in a display region near a frame region and vertical streak unevenness in the display region is not discussed.

The disclosure has been conceived in view of the above circumstances, and an object thereof is to provide a liquid crystal panel capable of suppressing white unevenness in a display region near a frame region and vertical streak unevenness in the display region, and to provide a three-dimensional display device including the above liquid crystal panel.

(1) A liquid crystal panel of an embodiment of the disclosure is provided with a display region and a frame region disposed around the display region, and includes a first substrate and a second substrate disposed facing the first substrate. In the display region, a liquid crystal layer is disposed between the first substrate and the second substrate. In the frame region, a sealing portion is disposed between the first substrate and the second substrate. The first substrate includes a first support substrate and a first substrate-side insulating layer in order toward the liquid crystal layer side. The second substrate includes a protrusion protruding to the liquid crystal layer side. The first substrate-side insulating layer includes a first thickness portion having a flat surface on the liquid crystal layer side, and a second thickness portion protruding to the liquid crystal layer side relative to the first thickness portion and disposed to face the protrusion.

(2) A liquid crystal panel of an embodiment of the disclosure is such that, in addition to having the configuration of (1) described above, the second thickness portion is formed in a truncated cone shape.

(3) A liquid crystal panel of an embodiment of the disclosure is such that, in addition to having the configuration of (1) or (2) described above, a total sum of a height of a portion of the second thickness portion protruding to the liquid crystal layer side relative to the first thickness portion and a height of the protrusion is equal to a thickness of the liquid crystal layer.

(4) A liquid crystal panel of an embodiment of the disclosure is such that, in addition to having the configuration of (1), (2), or (3) described above, an entire surface of the protrusion facing the first substrate is included inside a surface of the second thickness portion facing the second substrate in a plan view.

(5) A liquid crystal panel of an embodiment of the disclosure is such that, in addition to having the configuration of (1), (2), (3), or (4) described above, the second substrate includes a second support substrate and a second substrate-side insulating layer in order toward the liquid crystal layer side.

(6) A liquid crystal panel of an embodiment of the disclosure is such that, in addition to having the configuration of (5) described above, the second substrate-side insulating layer includes a third thickness portion having a flat surface on the liquid crystal layer side and a fourth thickness portion protruding to the liquid crystal layer side relative to the third thickness portion, and the fourth thickness portion is the protrusion mentioned above.

(7) A liquid crystal panel of an embodiment of the disclosure is such that, in addition to having the configuration of (1), (2), (3), (4), (5), or (6) described above, the first substrate further includes a first transparent conductive film disposed on the liquid crystal layer side of the first substrate-side insulating layer, and a first insulating layer disposed on the liquid crystal layer side of the first transparent conductive film.

(8) A liquid crystal panel of an embodiment of the disclosure is such that, in addition to having the configuration of (1), (2), (3), (4), (5), (6), or (7) described above, the second substrate includes a second support substrate, a second transparent conductive film disposed on the liquid crystal layer side of the second support substrate, and a second insulating layer disposed on the liquid crystal layer side of the second transparent conductive film.

(9) A three-dimensional display device of another embodiment of the disclosure includes a display panel, a polarizer having a transmission axis, the liquid crystal panel according to any one of (1), (2), (3), (4), (5), (6), (7), and (8) described above, and polarized glasses in order toward a viewer side.

(10) A three-dimensional display device of an embodiment of the disclosure further includes, in addition to having the configuration of (9) described above, a $\lambda/4$ retarder between the polarizer and the liquid crystal panel, wherein the liquid crystal panel is able to switch a phase difference between $\lambda/2$ and 0 nm, and a slow axis of the liquid crystal panel is orthogonal to a slow axis of the $\lambda/4$ retarder.

(11) A three-dimensional display device of another embodiment of the disclosure includes a display panel, a polarizer having a transmission axis, a first liquid crystal panel made of the liquid crystal panel according to any one of (1), (2), (3), (4), (5), (6), (7), and (8) described above, a second liquid crystal panel made of the liquid crystal panel according to any one of (1), (2), (3), (4), (5), (6), (7), and (8) described above, and polarized glasses in order toward a viewer side.

(12) A three-dimensional display device of an embodiment of the disclosure further includes, in addition to having the configuration of (11) described above, a $\lambda/4$ retarder between the polarizer and the liquid crystal panel, wherein the first liquid crystal panel and the second liquid crystal panel are each able to switch a phase difference between $\lambda/4$ and 0 nm, a slow axis of the first liquid crystal panel is orthogonal to a slow axis of the $\lambda/4$ retarder, and a slow axis of the second liquid crystal panel is orthogonal to the slow axis of the $\lambda/4$ retarder.

According to the disclosure, it is possible to provide a liquid crystal panel capable of suppressing white unevenness in a display region near a frame region and vertical streak unevenness in the display region, and to provide a three-dimensional display device including the liquid crystal panel described above.

BRIEF DESCRIPTION OF DRAWINGS

The disclosure will be described with reference to the accompanying drawings, wherein like numbers reference like elements.

DESCRIPTION OF EMBODIMENTS

Figure 1:
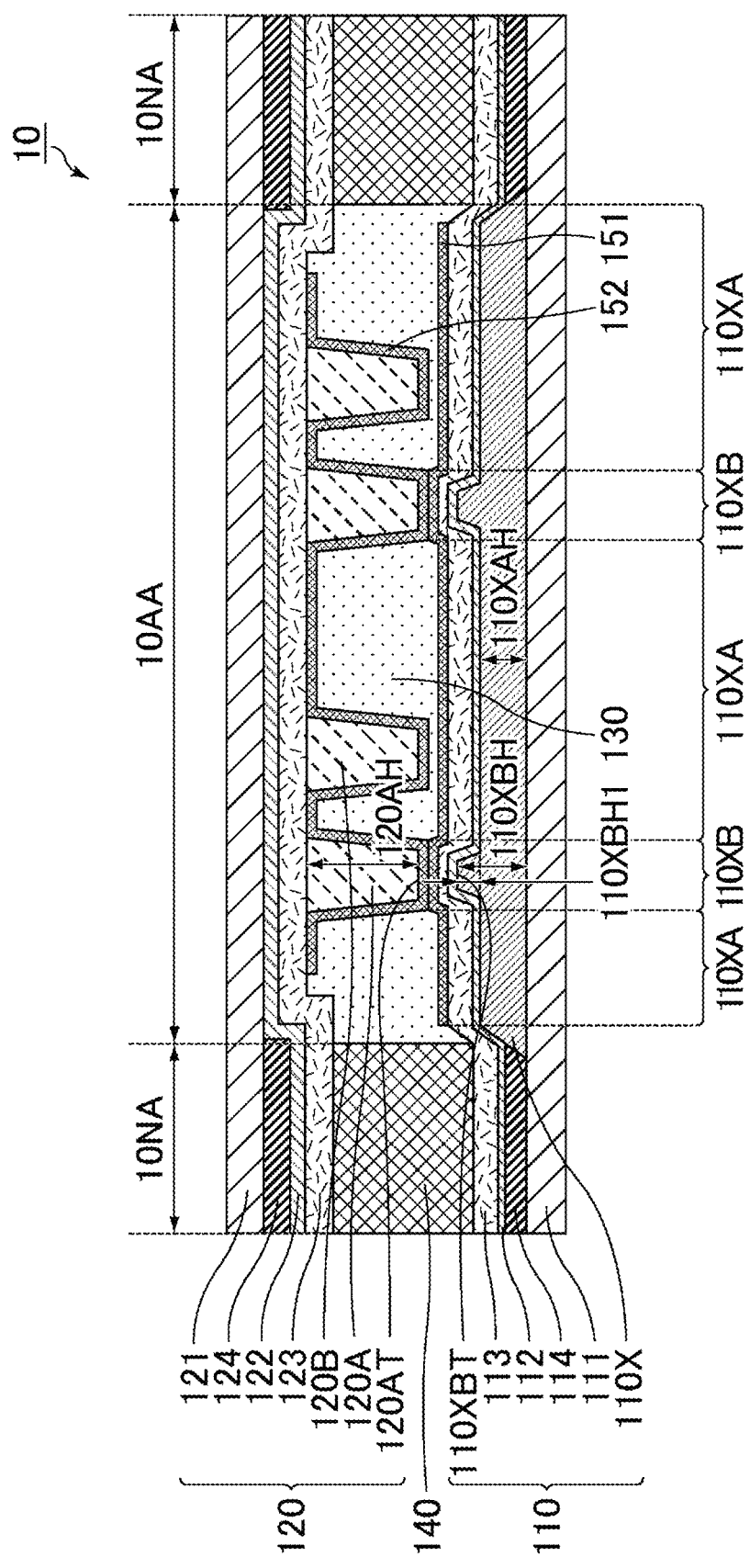
FIG. 1 is a schematic cross-sectional view of a liquid crystal panel according to a first embodiment.

Embodiments according to the disclosure will be described hereinafter. The technology according to the disclosure is not limited to the contents described in the following embodiments, and appropriate design changes can be made within a scope that satisfies the configuration according to the disclosure. In the description below, the same reference signs are appropriately used in common among the different drawings for the same parts or parts having similar functions, and repeated description thereof will be omitted as appropriate. The aspects of the disclosure may be combined as appropriate within a range that does not depart from the gist of the disclosure.

Definitions of Terms

In this specification, the observation face side of a certain member refers to a side of the member closer to a viewer, and the back face side of a certain member refers to a side of the member farther from the viewer.

In the present specification, an azimuthal direction means a direction when a target direction is projected on a screen of the liquid crystal panel, and is represented by an angle (azimuth angle) formed between the target direction and a reference azimuthal direction. When the screen of the liquid crystal panel is viewed from the observation face side (front surface), the angle (azimuth angle) takes a positive angle in the counterclockwise direction and takes a negative angle in the clockwise direction. The angle (azimuth angle) represents a value measured in a state where the display panel is seen in a plan view.

In the present specification, the expression "two straight lines (including axes and directions) are orthogonal to each other" means that the straight lines are orthogonal to each other in a plan view unless otherwise specified. The expression "two straight lines (including axes and directions) are parallel to each other" means that the straight lines are parallel to each other in a plan view unless otherwise specified.

In the present specification, the expression "two axes (directions) are orthogonal to each other" means that an angle (absolute value) formed between the axes (directions) is in a range of 90±3°, is preferably in a range of 90±1°, is more preferably in a range of 90±0.5°, and is particularly preferably 90° (completely orthogonal). The expression "two axes (directions) are parallel" means that an angle (absolute value) formed between the axes (directions) is in a range of 0±3°, is preferably in a range of 0±1°, is more preferably in a range of 0±0.5°, and is particularly preferably 0° (completely parallel).

In the present specification, an axial azimuthal direction refers to a transmission axis of a polarizer, an azimuthal direction of a slow axis of a retarder, or an azimuthal direction of a slow axis of a liquid crystal layer, unless otherwise specified.

In the present specification, a direction parallel to a slow axis of the liquid crystal panel is defined as an x-axis, and a direction orthogonal thereto is defined as a y-axis. The term "nx" represents a refractive index in the x-axis direction, the term "ny" represents a refractive index in the y-axis direction, and the term "nz" represents a refractive index in the thickness direction. The refractive index refers to a value for light having a wavelength of 550 nm at 23° C., unless otherwise indicated. Note that the light having a wavelength of 550 nm is light of a wavelength at which visual sensitivity of a person is highest.

In the present specification, an in-plane phase difference (Re) refers to an in-plane phase difference of a layer (film) at 23° C., at a wavelength of 550 nm unless otherwise specified. Re is determined by an equation of Re=(nx−ny)× d, where d is a thickness (nm) of the layer (film). In the present specification, "phase difference" refers to an in-plane phase difference unless otherwise specified.

In the present specification, a phase difference of +λ/4 means that the slow axis is parallel to the x-axis direction and the absolute value of the phase difference is λ/4. A phase difference of −λ/4 means that the slow axis is parallel to the y-axis direction and the absolute value of the phase difference is λ/4. The absolute value of the phase difference being λ/4 means that the absolute value of the phase difference is preferably in a range from 100 nm to 176 nm, and is particularly preferably 137.5 nm. A phase difference of λ/2 is preferably a phase difference in a range from 240 nm to 310 nm, and is particularly preferably a phase difference of 275 nm.

In the present specification, a λ/4 retarder is a retarder in which the absolute value of the phase difference is λ/4. In the present specification, a λ/2 retarder is a retarder in which the absolute value of the phase difference is λ/2.

Embodiments according to the disclosure will be described hereinafter. The technology according to the disclosure is not limited to the contents described in the following embodiments, and appropriate design changes can be made within a scope that satisfies the configuration according to the disclosure.

First Embodiment

FIG. 1 is a schematic cross-sectional view of a liquid crystal panel according to a first embodiment. As illustrated in FIG. 1, a liquid crystal panel 10 according to the present embodiment is provided with a display region 10AA and a frame region 10NA disposed around the display region 10AA, and includes a first substrate 110 and a second substrate 120 disposed to face the first substrate 110. In the display region 10AA, a liquid crystal layer 130 is disposed between the first substrate 110 and the second substrate 120. In the frame region 10NA, a sealing portion 140 is disposed between the first substrate 110 and the second substrate 120. The first substrate 110 includes a first support substrate 111 and a first substrate-side insulating layer 110X in order toward a liquid crystal layer 130 side. The second substrate 120 includes a spacer 120A as a protrusion protruding to the liquid crystal layer 130 side. The first substrate-side insulating layer 110x includes a first thickness portion 110XA having a flat surface on the liquid crystal layer 130 side, and a second thickness portion 110XB protruding to the liquid crystal layer 130 side relative to the first thickness portion 110XA and disposed to face the spacer 120A as the protrusion described above.

By disposing the second thickness portion 110XB to face the spacer 120A in this manner, the spacer 120A can be supported by the second thickness portion 110XB. This makes it possible to suppress a situation in which the total thickness of a substrate inner side in the display region 10AA near the frame region 10NA (to be specific, the sealing portion 140) is larger than the total thickness of a substrate inner side in the display region 10AA at a location away from the frame region 10NA, and to suppress unevenness in thickness of the liquid crystal layer 130 (also referred to as cell thickness). As a result, for example, when the liquid crystal panel 10 of the present embodiment is used as an active retarder, it is possible to suppress white unevenness in the display region 10AA near the frame region 10NA. Here, the "substrate inner side" refers to a region between a support substrate (e.g., glass substrate) included in the first substrate 110 and a support substrate (e.g., glass substrate) included in the second substrate 120. When the support substrate is a glass substrate, the "substrate inner side" is particularly referred to as "glass substrate inner side".

In addition, by providing the first thickness portion 110XA having a flat surface on the liquid crystal layer 130 side on the first support substrate 111, it is possible to reduce the influence of waviness of the substrate surface generated at the time of manufacturing the first support substrate 111, on the liquid crystal layer 130. As a result, the unevenness in thickness of the liquid crystal layer 130 can be suppressed, and when the liquid crystal panel 10 of the present embodiment is used as an active retarder, vertical streak unevenness can be suppressed.

Figure 2:
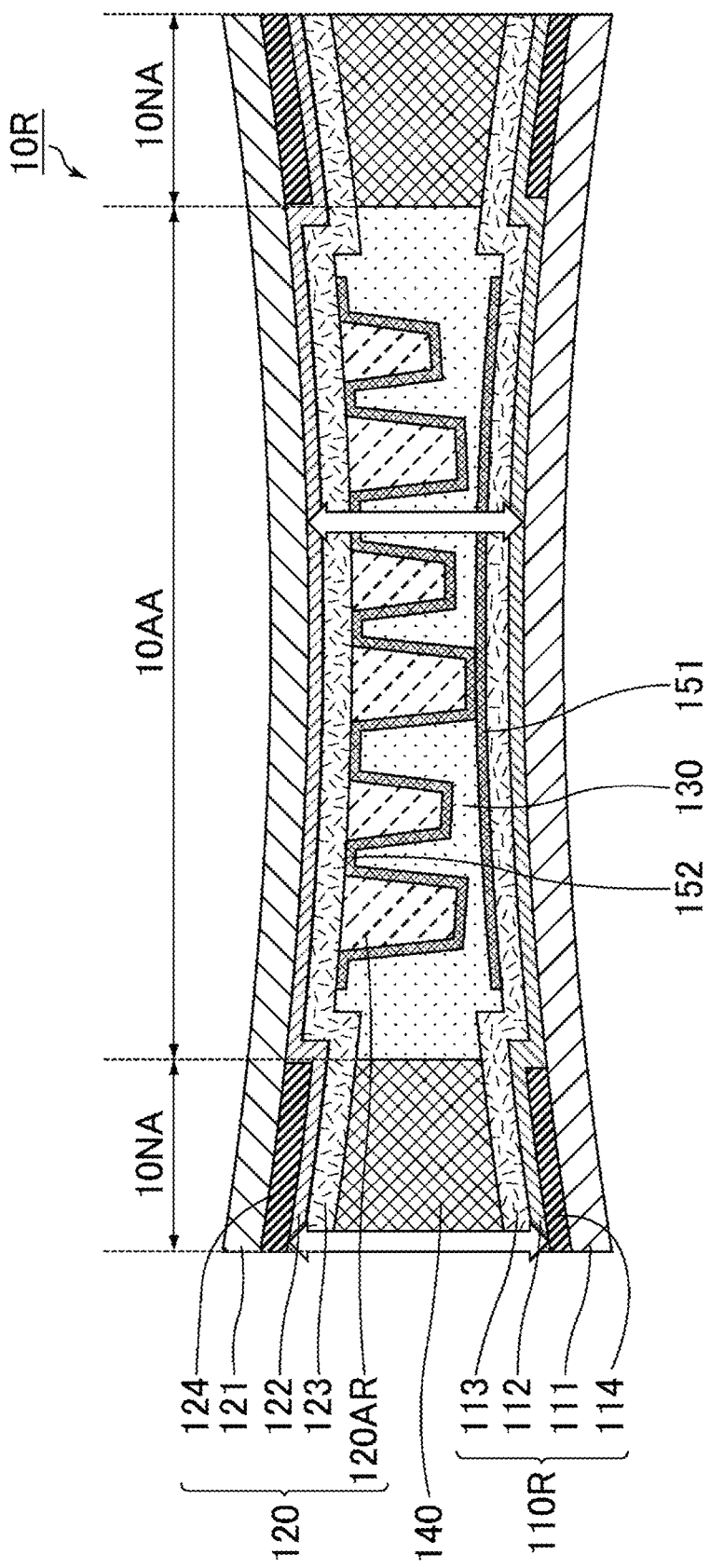
FIG. 2 is a schematic cross-sectional view of an active retarder of a comparative embodiment.

Here, an active retarder of a comparative embodiment will be described. FIG. 2 is a schematic cross-sectional view of the active retarder of the comparative embodiment. As illustrated in FIG. 2, a liquid crystal panel 10R according to the comparative embodiment is provided with a display region 10AA and a frame region 10NA disposed around the display region 10AA, and includes a first substrate 110R and a second substrate 120 disposed to face the first substrate 110R. In the display region 10AA, a liquid crystal layer 130 is disposed between the first substrate 110R and the second substrate 120, and in the frame region 10NA, a sealing portion 140 is disposed between the first substrate 110R and the second substrate 120.

To be more specific, in the display region 10AA, the first substrate 110R includes a first support substrate 111, a first transparent conductive film 112, and a first insulating layer 113 in order toward the liquid crystal layer 130 side. In the display region 10AA, the second substrate 120 includes a second support substrate 121, a second transparent conductive film 122, a second insulating layer 123, and a spacer 120AR in order toward the liquid crystal layer 130 side.

In the frame region 10NA, the first substrate 110R includes the first support substrate 111, a first metal layer 114, the first transparent conductive film 112, and the first insulating layer 113 in order toward a sealing portion 140 side. In the frame region 10NA, the second substrate 120 includes the second support substrate 121, a second metal layer 124, the second transparent conductive film 122, and the second insulating layer 123 in order toward the sealing portion 140 side.

A first alignment film 151 is disposed between the first substrate 110R and the liquid crystal layer 130, and a second alignment film 152 is disposed between the second substrate 120 and the liquid crystal layer 130.

The first support substrate 111 and the second support substrate 121 are glass substrates. The thicknesses of the first support substrate 111 and the second support substrate 121 are each 0.5 mm. The first transparent conductive film 112 is 70 nm in thickness. The first insulating layer 113 is 530 nm in thickness. The second transparent conductive film 122 is 140 nm in thickness. The second insulating layer 123 is 680 nm in thickness. The thicknesses of the first alignment film 151 and the second alignment film 152 are each 90 nm. The thicknesses of the first metal layer 114 and the second metal layer 124 are each 360 nm. An optimum cell thickness of the liquid crystal panel 10R (thickness of the liquid crystal layer 130) is approximately 1.62 µm.

In the display region 10AA, the first transparent conductive film 112, the first insulating layer 113, the first alignment film 151, the liquid crystal layer 130, the second alignment film 152, and the second insulating layer 123 are disposed between the first support substrate 111 and the second support substrate 121. Accordingly, the total thickness of the glass substrate inner side in the display region 10AA, that is, the total thickness of the glass substrate inner side interposed between the first support substrate 111 and the second support substrate 121 in the display region 10AA is 3220 nm.

In the frame region 10NA, the first metal layer 114, the first transparent conductive film 112, the first insulating layer 113, the sealing portion 140, the second insulating layer 123, the second transparent conductive film 122, and the second metal layer 124 are disposed between the first support substrate 111 and the second support substrate 121.

In consideration of the display quality, the total thickness of the glass substrate inner side in the frame region 10NA is expected to be equal to the total thickness of the glass substrate inner side in the display region 10AA. In a case of voltage input of the common transfer scheme, the adjustment of the total thickness of the glass substrate inner side in the frame region 10NA is usually made with conductive beads for sealing and a spacer for sealing.

In the case of the liquid crystal panel 10R of the comparative embodiment, strictly speaking, conductive beads for sealing (diameter: 1.51 µm) and a spacer for sealing (diameter: 1.08 µm) having the diameters that cause the height of the sealing portion 140 to be 1080 nm should be used. However, the minimum diameter of the conductive beads for sealing in the products commercially available and the products developed by material manufacturers is 3.0 µm, and in this case, the diameter of the spacer for sealing is 2.0 µm. Since the height of the sealing portion 140 is substantially equal to the diameter of the spacer for sealing, the total thickness of the glass substrate inner side in the frame region 10NA is 4140 nm, which is larger than the total thickness of the glass substrate inner side in the display region 10AA by 920 nm.

Due to this difference in total thickness, in the liquid crystal panel 10R of the comparative embodiment, the sealing portion 140 serves as a column, so that the height of the display region 10AA near the sealing portion 140 cannot be suppressed, and the cell thickness becomes large. That is, the total thickness of the glass substrate inner side in the display region 10AA near the sealing portion 140 is larger than the total thickness of the glass substrate inner side in the display region 10AA at a location away from the frame region 10NA, so that the desired retardation cannot be obtained in the display region 10AA near the sealing portion 140. As a result, when the liquid crystal panel 10R of the comparative embodiment is used as an active retarder, display unevenness is visually recognized in the display region 10AA near the sealing portion 140 (near the frame region 10NA). Since an optimum cell thickness of the liquid crystal panel 10R of the comparative embodiment used as an active retarder is as narrow as 2.0 µm or less (for example, approximately 1.62 µm), uniformity of the cell thickness is an important issue.

A method for calculating the diameter of the spacer for sealing will be described below. An optimum diameter of the spacer for sealing is a length obtained by multiplying the diameter of the conductive beads for sealing by the compressibility of the conductive beads for sealing. For example, when conductive beads for sealing having a diameter of 3.0 µm and a compressibility of 0.714 are used, the optimum diameter of the spacer for sealing is 2.14 µm according to Equation S1 given below.

$$\text{Optimum diameter of spacer for sealing} = 3.0 \ \mu m \times 0.714 = 2.14 \ \mu m \quad \text{(Equation S1)}$$

From the lineup of commercially available spacers for sealing, a spacer for sealing having a diameter of 2.0 µm is used in the liquid crystal panel of the comparative embodiment.

In a display device using the liquid crystal panel 10R of the comparative embodiment as a 3D active retarder, vertical streak unevenness occurs in the display region 10AA. It is conceivable that the cell thickness becomes non-uniform due to interference of waviness of the glass substrate generated at the time of manufacturing the glass substrate, thereby causing the generation of vertical streak unevenness.

The insulating layer disclosed in JP 8-211395 A is a raising layer for adjusting the cell thickness. The thickness of the above insulating layer is uniform, and an insulating layer having two thicknesses like the first substrate-side insulating layer 110X of the present embodiment is not disclosed therein. JP 8-211395 A does not refer to an edge shape, a surface structure, or the like of the insulating layer.

On the other hand, in the liquid crystal panel 10 of the present embodiment, the second thickness portion 110XB thicker than the first thickness portion 110XA is disposed in the region facing the spacer 120A, thereby making it possible to suppress cell thickness unevenness. As a result, when the liquid crystal panel 10 of the present embodiment is used as an active retarder, it is possible to suppress white unevenness in the display region 10AA near the frame region 10NA. As a result, when the liquid crystal panel 10 of the present embodiment is used as an active retarder, vertical streak unevenness can be suppressed. Hereinafter, the liquid crystal panel 10 of the present embodiment will be described in detail.

As illustrated in FIG. 1, the liquid crystal panel 10 according to the present embodiment is provided with the display region 10AA and the frame region 10NA disposed around the display region 10AA, and includes the first substrate 110 and the second substrate 120 disposed to face the first substrate 110. In the display region 10AA, the liquid crystal layer 130 is disposed between the first substrate 110 and the second substrate 120, and in the frame region 10NA, the sealing portion 140 is disposed between the first substrate 110 and the second substrate 120. Here, "a certain member is disposed to face another member" means, for example, that a certain member overlaps with another member in a plan view. In this case, in the plan view, it is preferable that 90% or more and 100% or less of an area of the certain member overlap with the other member, and is more preferable that 95% or more and 100% or less of the area of the certain member overlap with the other member.

In the display region 10AA, the first substrate 110 includes the first support substrate 111, the first substrate-side insulating layer 110X, a first transparent conductive film 112, and a first insulating layer 113 in order toward the liquid crystal layer 130 side. In the display region 10AA, the second substrate 120 includes a second support substrate 121, a second transparent conductive film 122, a second insulating layer 123, and the spacer 120A in order toward the liquid crystal layer 130 side. The display region 10AA is a region in which the phase difference may change.

In the frame region 10NA, the first substrate 110 includes the first support substrate 111, a first metal layer 114, the first transparent conductive film 112, and the first insulating layer 113 in order toward the sealing portion 140 side. The first metal layer 114 is in contact with an edge of the first substrate-side insulating layer 110X. In the frame region 10NA, the second substrate 120 includes a second support substrate 121, a second metal layer 124, a second transparent conductive film 122, and a second insulating layer 123 in order toward the sealing portion 140 side.

A first alignment film 151 is disposed between the first substrate 110 and the liquid crystal layer 130, and a second alignment film 152 is disposed between the second substrate 120 and the liquid crystal layer 130.

The first substrate-side insulating layer 110X includes the first thickness portion 110XA having a flat surface on the liquid crystal layer 130 side, and the second thickness portion 110XB protruding to the liquid crystal layer 130 side relative to the first thickness portion 110XA and disposed to face the spacer 120A as the protrusion described above. An edge of the first substrate-side insulating layer 110X has a slope portion. The metal layer 114 is in contact with the slope portion.

The shape of the second thickness portion 110XB is not particularly limited, but the second thickness portion 110XB may be formed in, for example, a truncated cone shape, a cylindrical shape, a truncated pyramid shape, or a prism shape. The second thickness portion 110XB is preferably formed in a truncated cone shape. The shape of the second thickness portion 110XB refers to the shape of a portion of the second thickness portion 110XB protruding to the liquid crystal layer 130 side relative to the first thickness portion 110XA.

The first substrate-side insulating layer 110X may be a single layer or a layered body of a plurality of layers, but is preferably a single layer. For example, as a case where the first substrate-side insulating layer 110X is formed of two layers, the following configuration may be exemplified. That is, the first thickness portion 110XA and a portion of the second thickness portion 110XB disposed on an extension line of the first thickness portion 110XA may be formed of a single layer, and a portion of the second thickness portion 110XB protruding to the liquid crystal layer 130 side relative to the first thickness portion 110XA may be formed of a layer different from the single layer mentioned above.

The first substrate-side insulating layer 110X may be a layered body of a plurality of insulating layers. The whole of a face of the first support substrate-side of the first substrate-side insulating layer 110X may be in contact with the first support substrate 111, or a part of the face of the first support substrate-side of the first substrate-side insulating layer 110X may be in contact with the first support substrate 111. For example, the other member (for example, a metal wire) may be disposed between the first support substrate 111 and the first substrate-side insulating layer 110X, and a part of the face of the first support substrate-side of the first substrate-side insulating layer 110X which does not overlap with the other member may be in contact with the first support substrate 111.

As the first substrate-side insulating layer 110X, an organic insulating layer may be used, for example. Examples of the organic insulating layer may include organic films such as an acrylic resin, polyimide resin and novolac resin, and layered bodies thereof.

The surface on the liquid crystal layer 130 side of the first thickness portion 110XA is flat. With the aspect described above, it is possible to reduce the influence of waviness of the substrate surface generated at the time of manufacturing the first support substrate 111, on the liquid crystal layer 130. As a result, the unevenness in thickness of the liquid crystal layer 130 can be suppressed, and when the liquid crystal panel 10 of the present embodiment is used as an active retarder, vertical streak unevenness can be suppressed. In the present specification, "being flat" means, for example, that the ten point average roughness (Rzjis) in accordance with JIS B0601 is in a range from 0 µm to 0.2 µm.

The first thickness portion 110XA preferably occupies 99.00% or more and 99.99% or less of the area of the display region 10AA, more preferably 99.50% or more and 99.99% or less thereof, and still more preferably 99.94% or more and 99.98% or less thereof.

The first thickness portion 110XA is provided such that the total thickness of the glass substrate inner side in the display region 10AA is equal to the total thickness of the glass substrate inner side in the frame region 10NA. Such an aspect makes it possible to suppress a difference between the cell thickness in the display region 10AA near the frame region 10NA and the cell thickness in the display region 10AA at a location away from the frame region 10NA. As a result, when the liquid crystal panel 10 of the present embodiment is used as an active retarder, it is possible to suppress white unevenness in the display region 10AA near the frame region 10NA, and enhance the performance of the active retarder.

The second thickness portion 110XB protrudes to the liquid crystal layer 130 side relative to the first thickness portion 110XA. A height 110XBH (thickness) of the second thickness portion 110XB is preferably more than 1.0 time and not more than 2.5 times, more preferably not less than 1.1 times and not more than 2.0 times, and still more preferably not less than 1.2 times and not more than 1.6 times a height 110XAH of the first thickness portion 110XA.

For example, it is preferable that the height 110XAH of the first thickness portion 110XA be in a range from 750 nm to 1050 nm, and the height 110XBH of the second thickness portion 110XB be in a range from 1100 nm to 1400 nm, it is more preferable that the height 110XAH of the first thickness portion 110XA be in a range from 800 nm to 1000 nm, and the height 110XBH of the second thickness portion 110XB be in a range from 1150 nm to 1350 nm, and it is further preferable that the height 110XAH of the first thickness portion 110XA be in a range from 850 nm to 950 nm, and the height 110XBH of the second thickness portion 110XB be in a range from 1200 nm to 1300 nm.

The height 110XAH of the first thickness portion 110XA refers to a distance from a surface on the first support substrate 111 side of the first thickness portion 110XA to a surface on the second substrate 120 side thereof. The height 110XBH of the second thickness portion 110XB refers to a distance from a surface on the first support substrate 111 side of the second thickness portion 110XB to a surface on the second substrate 120 side thereof. In this case, the surface on the first substrate 110 side refers to a surface closest to the first substrate 110, and the surface on the second substrate 120 side refers to a surface closest to the second substrate 120.

The second thickness portion 110XB is disposed to face the spacer 120A serving as the protrusion. In a plan view, it is preferable that the entirety of a surface 120AT of the spacer 120A as the protrusion facing the first substrate 110 be included inside a surface 110XBT of the second thickness portion 110XB facing the second substrate 120. With the above aspect, the surface 110XBT of the second thickness portion 110XB can be comprehensively disposed with respect to the surface 120AT of the spacer 120A facing the first substrate 110, and thus the cell thickness can be more effectively defined. The entirety of a surface may be substantially the entire surface, and may be, for example, an area including 90% or more and 100% or less of the entire surface. The expression "being included inside something" also includes a case of matching something completely.

The second thickness portion 110XB is preferably in contact with the spacer 120A serving as the protrusion. To be more specific, in a normal state in which no load is applied to the liquid crystal panel 10, it is preferable for a top portion of the second thickness portion 110XB (surface 110XBT on the second substrate 120 side) to be in contact with a top portion of the spacer 120A (surface 120AT on the first substrate 110 side). With such an aspect, a distance between the first substrate 110 and the second substrate 120 (cell thickness) can be defined. The above-discussed spacer 120A is also referred to as a main spacer. In the present specification, the term "contact" includes not only a case of direct contact but also a case of contact via another member.

The total sum of a height 110XBH1 of a portion of the second thickness portion 110XB protruding to the liquid crystal layer 130 side relative to the first thickness portion 110XA and a height 120AH of the spacer 120A serving as the protrusion is preferably equal to the thickness (cell thickness (e.g., 1.62 μm)) of the liquid crystal layer 130. With the aspect described above, the cell thickness may be more effectively defined. In this case, the height 110XBH1 of the protruding portion is a difference between the height 110XBH of the second thickness portion 110XB and the height 110XAH of the first thickness portion 110XA. The expression "heights are equal to each other" means that the heights are substantially equal to each other, and for example, refers to a case in which the difference in height is in a range from 0 nm to 30 nm.

As described above, the spacer 120A included in the second substrate 120 is the main spacer. The spacer 120A is provided above the second support substrate 121 and protrudes to the liquid crystal layer 130 side. The spacer 120A has a function to maintain the distance between the first substrate 110 and the second substrate 120 (thickness of the liquid crystal layer 130) in a normal state in which no load is applied to the liquid crystal panel 10. In the normal state in which no load is applied to the liquid crystal panel 10, the spacer 120A is in contact with the first substrate 110 (more specifically, the second thickness portion 110XB).

It is sufficient for the spacer 120A as the protrusion to protrude to the liquid crystal layer 130 side. The height 120AH of the spacer 120A is not particularly limited, but is in a range from 0.1 μm to 3.0 μm, for example.

The second substrate 120 may further include a sub-spacer 120B as a second protrusion that protrudes to the liquid crystal layer 130 side and does not face the second thickness portion 110XB. In the normal state in which no load is applied to the liquid crystal panel 10, the sub-spacer 120B is not in contact with the first substrate 110. However, when a load is applied to the liquid crystal panel 10, the sub-spacer 120B comes into contact with the first substrate 110. As a result, the first substrate 110 and the second substrate 120 can be supported by both the spacer 120A and the sub-spacer 120B, thereby making it possible to increase the load capacity.

The spacer 120A and the sub-spacer 120B may have the same shape and size, or may have different shapes and sizes. However, they may preferably have the same shape and size. According to this aspect, the sub-spacer 120B may be easily provided. To be specific, the height of the sub-spacer 120B is preferably equal to the height of the spacer 120A.

It is preferable that the spacer 120A and the sub-spacer 120B contain a cured product of a photosensitive resin. Examples of the photosensitive resin include a resin having an ultraviolet reactive functional group. The spacer 120A and the sub-spacer 120B are obtained by applying a photosensitive resin-containing composition onto the second support substrate 121 and patterning the applied composition by a known photolithography method.

The first substrate 110 includes the first transparent conductive film 112 disposed on the liquid crystal layer 130 side of the first substrate-side insulating layer 110x, and the first insulating layer 113 disposed on the liquid crystal layer 130 side of the first transparent conductive film 112. With the aspect described above, leakage of the first substrate 110 and the second substrate 120 may be suppressed.

The second substrate 120 includes the second support substrate 121, the second transparent conductive film 122 disposed on the liquid crystal layer 130 side of the second support substrate 121, and the second insulating layer 123 disposed on the liquid crystal layer 130 side of the second transparent conductive film 122. With the aspect described above, leakage of the first substrate 110 and the second substrate 120 may be suppressed.

Examples of the first support substrate 111 and the second support substrate 121 include insulating substrates such as a glass substrate and a plastic substrate. Examples of materials for the glass substrate include glass such as float glass and soda glass. Examples of materials for the plastic substrate include plastics such as polyethylene terephthalate, polybutylene terephthalate, polyether sulfone, polycarbonate, and alicyclic polyolefin.

Each of the thicknesses of the first support substrate 111 and the second support substrate 121 is not particularly limited, but is preferably, for example, in a range from 0.1 mm to 1.0 mm.

Examples of the first transparent conductive film 112 and the second transparent conductive film 122 include transparent conductive materials such as indium tin oxide (ITO), indium zinc oxide (IZO), zinc oxide (ZnO) and tin oxide (SnO), and alloys thereof. The first transparent conductive film 112 and the second transparent conductive film 122 can be formed in such a manner that a single layer or a plurality of layers are film-formed by a sputtering method or the like, and then patterned by a photolithography method.

The thickness of the first transparent conductive film 112 is not particularly limited, but is preferably in a range from 10 nm to 150 nm, for example. The thickness of the second transparent conductive film 122 is not particularly limited, but is preferably in a range from 10 nm to 250 nm, for example.

Examples of the first insulating layer 113 and the second insulating layer 123 may include an inorganic insulating layer, an organic insulating layer, and a layered body of the above-mentioned organic insulating layer and inorganic insulating layer. Examples of the inorganic insulating layer may include inorganic films such as silicon nitride (SiNx) and silicon oxide (SiO$_2$), and layered films thereof. Examples of the organic insulating layer may include organic films such as an acrylic resin, polyimide resin and novolac resin, and layered bodies thereof.

The thickness of the first insulating layer 113 is not particularly limited, but is preferably in a range from 70 nm to 750 nm, for example. The thickness of the second insulating layer 123 is not particularly limited, but is preferably in a range from 70 nm to 900 nm, for example.

The first insulating layer 113 and the second insulating layer 123 are insulating layers for preventing the leakage of the first substrate 110 and the second substrate 120. When the cell thickness is relatively large (for example, 2.0 μm or more), at least one of the first insulating layer 113 and the second insulating layer 123 is allowed not to be disposed.

The first metal layer 114 and the second metal layer 124 (hereinafter, also simply referred to as metal layers) are layers containing metal. Examples of the metal layer include Mo/Al, Al, and Cu. The metal layer is formed by, for example, providing a metal thin film using a sputtering method, and then patterning the metal thin film using a photolithography method.

Each of the thicknesses of the first metal layer 114 and the second metal layer 124 is not particularly limited, but is preferably in a range from 150 nm to 550 nm, for example.

The liquid crystal layer 130 contains a liquid crystal material. Then, an amount of light to be transmitted is controlled by applying a voltage to the liquid crystal layer 130 to change an alignment state of the liquid crystal molecules in the liquid crystal material in accordance with the applied voltage. The liquid crystal molecules may have a positive or negative vale of dielectric constant anisotropy (Ac) as defined by an equation given below. The liquid crystal molecules having positive dielectric constant anisotropy are also referred to as positive-working liquid crystal, and the liquid crystal molecules having negative dielectric constant anisotropy are also referred to as negative-working liquid crystal. The major axis direction of the liquid crystal molecules is a direction of the slow axis. The liquid crystal molecules take a homogeneous alignment in a state in which a voltage is not applied (voltage non-applied state), and the major axis direction of the liquid crystal molecules in the voltage non-applied state is also referred to as a direction of the initial alignment of the liquid crystal molecules.

Δε=(dielectric constant in major axis direction of liquid crystal molecules)−(dielectric constant in minor axis direction of liquid crystal molecules)  (Equation L)

Since the active retarder needs to perform switching following ultrahigh-speed image switching, the cell thickness of the liquid crystal layer 130 is preferably thin. The thickness of the liquid crystal layer 130 is preferably in a range from 1.0 μm to 2.0 μm, for example.

In the manufacture of a liquid crystal panel having such a small cell thickness, it may be difficult to control the cell thickness including manufacturing variations. However, in the present embodiment, by measuring the height 120AH of the spacer 120A and the height 110XBH1 of the protruding portion of the second thickness portion 110XB in advance, it is possible to select a combination of the first substrate 110 and the second substrate 120 capable of providing an optimum cell thickness and to bond them together, thereby making it possible to easily control the cell thickness.

The sealing portion 140 preferably includes, for example, a cured product of a curable resin. Examples of the curable resin include a resin having at least one of an ultraviolet reactive functional group and a thermal reactive functional group. The curable resin preferably has a (meth)acryloyl group and/or an epoxy group because the curing reaction proceeds rapidly and the adhesiveness is favorable. For example, (meth)acrylate, an epoxy resin, and the like may be used as the curable resin discussed above. These resins may be used alone, or two or more kinds thereof may be used in combination. In the present specification, (meth)acryl refers to acryl or methacryl.

The first alignment film 151 and the second alignment film 152 (hereinafter, also simply referred to as alignment films) each have a function of controlling the alignment of the liquid crystal molecules contained in the liquid crystal layer 130. When a voltage applied to the liquid crystal layer 130 is lower than a threshold voltage (including voltage non-application), the alignment of the liquid crystal molecules in the liquid crystal layer 130 is controlled mainly by the function of the alignment films.

As materials for the alignment films, materials commonly used in the field of liquid crystal display panels, such as a polymer including polyimide as a main chain, a polymer including polyamic acid as a main chain, and a polymer including polysiloxane as a main chain, can be used. The alignment film can be formed by applying an alignment film material, and the coating method is not limited. For example, flexographic printing, ink-jet coating, or the like can be used.

The alignment film may be a horizontal alignment film in which liquid crystal compounds are substantially horizontally aligned with respect to the film plane, or may be a vertical alignment film in which liquid crystal molecules are substantially vertically aligned with respect to the film plane. The alignment film may be a photo-alignment film having a photo-functional group and having been subjected to photo-alignment treatment as alignment treatment, may be a rubbing alignment film having been subjected to rubbing treatment as alignment treatment, or may be an alignment film not having been subjected to alignment treatment.

As a method of alignment treatment applied to the alignment film, a rubbing method in which the surface of the alignment film is rubbed with a roller or the like has been widely used. On the other hand, in recent years, a photo-alignment method of irradiating a surface of an alignment film with light has been widely developed as an alignment treatment method in place of the rubbing method. According to the photo-alignment method, the alignment treatment can be performed without contacting the surface of the alignment film. Therefore, unlike the rubbing treatment, there is an advantage that the generation of dirtiness, waste, and the like during the alignment treatment can be suppressed.

Each of the thicknesses of the first alignment film 151 and the second alignment film 152 is not particularly limited, but is preferably in a range from 10 nm to 300 nm, for example.

First Modified Example of First Embodiment

Figure 3:
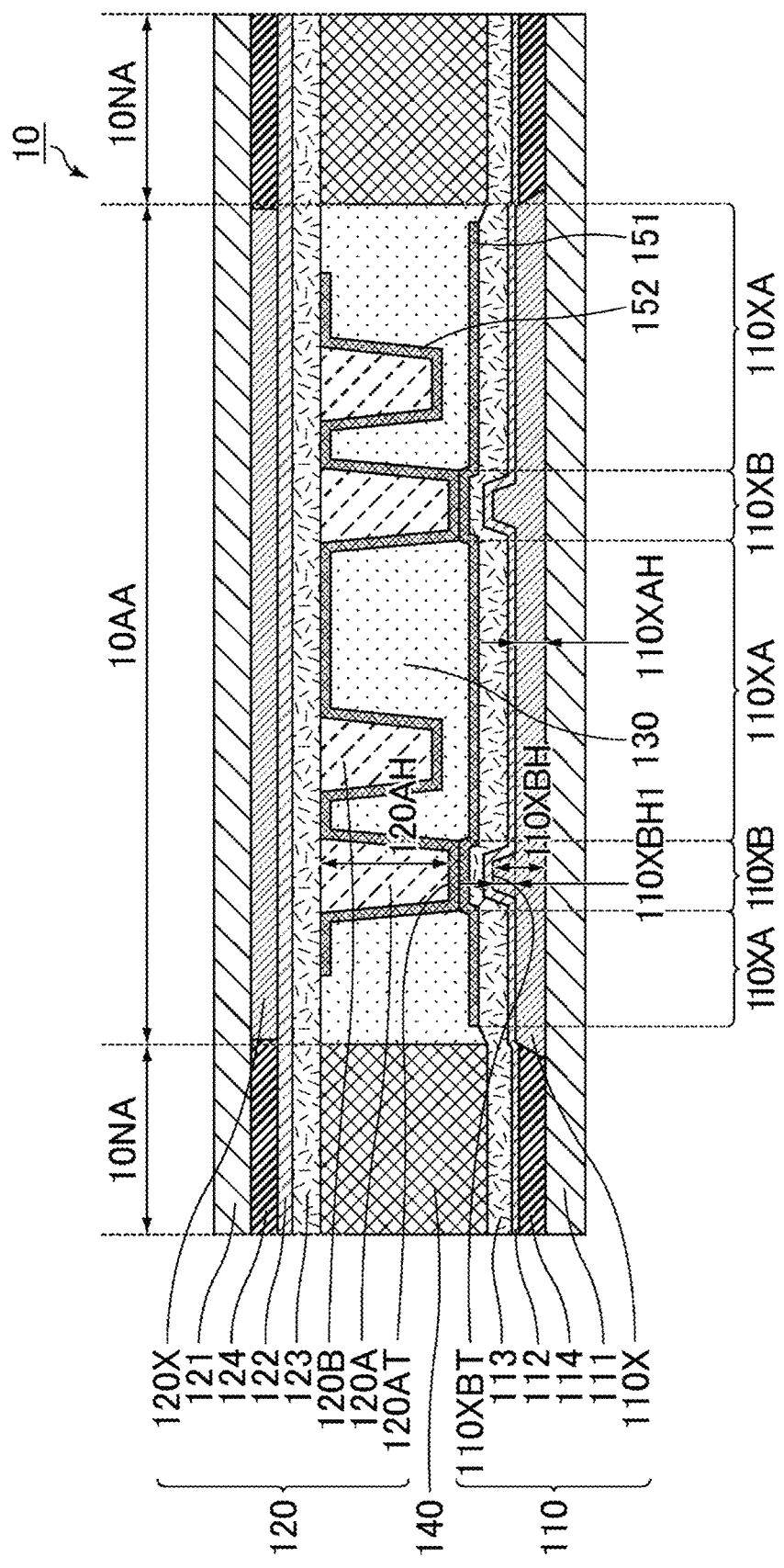
FIG. 3 is a schematic cross-sectional view of a liquid crystal panel according to a first modified example of the first embodiment.

FIG. 3 is a schematic cross-sectional view of a liquid crystal panel according to a first modified example of the first embodiment. As illustrated in FIG. 3, the second substrate 120 included in a liquid crystal panel 10 of the present modified example may include the second support substrate 121 and the second substrate-side insulating layer 120X in order toward the liquid crystal layer 130 side. According to such an aspect as well, it is possible to suppress white unevenness in the display region 10AA near the frame region 10NA and to suppress vertical streak unevenness.

The second substrate-side insulating layer 120X may be a single layer or a layered body of a plurality of layers, but is preferably a single layer. The second substrate-side insulating layer 120X preferably has a flat surface on the liquid crystal layer 130 side.

The second substrate-side insulating layer 120X may be a layered body of a plurality of insulating layers. The whole of a face of the second support substrate-side of the second substrate-side insulating layer 120X may be in contact with the second support substrate 121, or a part of the face of the second support substrate-side of the second substrate-side insulating layer 120X may be in contact with the second support substrate 121. For example, the other member (for example, a metal wire) may be disposed between the second support substrate 121 and the second substrate-side insulating layer 120X, and a part of the face of the second support substrate-side of the second substrate-side insulating layer 120X which does not overlap with the other member may be in contact with the second support substrate 121.

As the second substrate-side insulating layer 120X, an organic insulating layer may be used, for example. Examples of the organic insulating layer may include organic films such as an acrylic resin, polyimide resin and novolac resin, and layered bodies thereof.

Second Modified Example of First Embodiment

Figure 4:
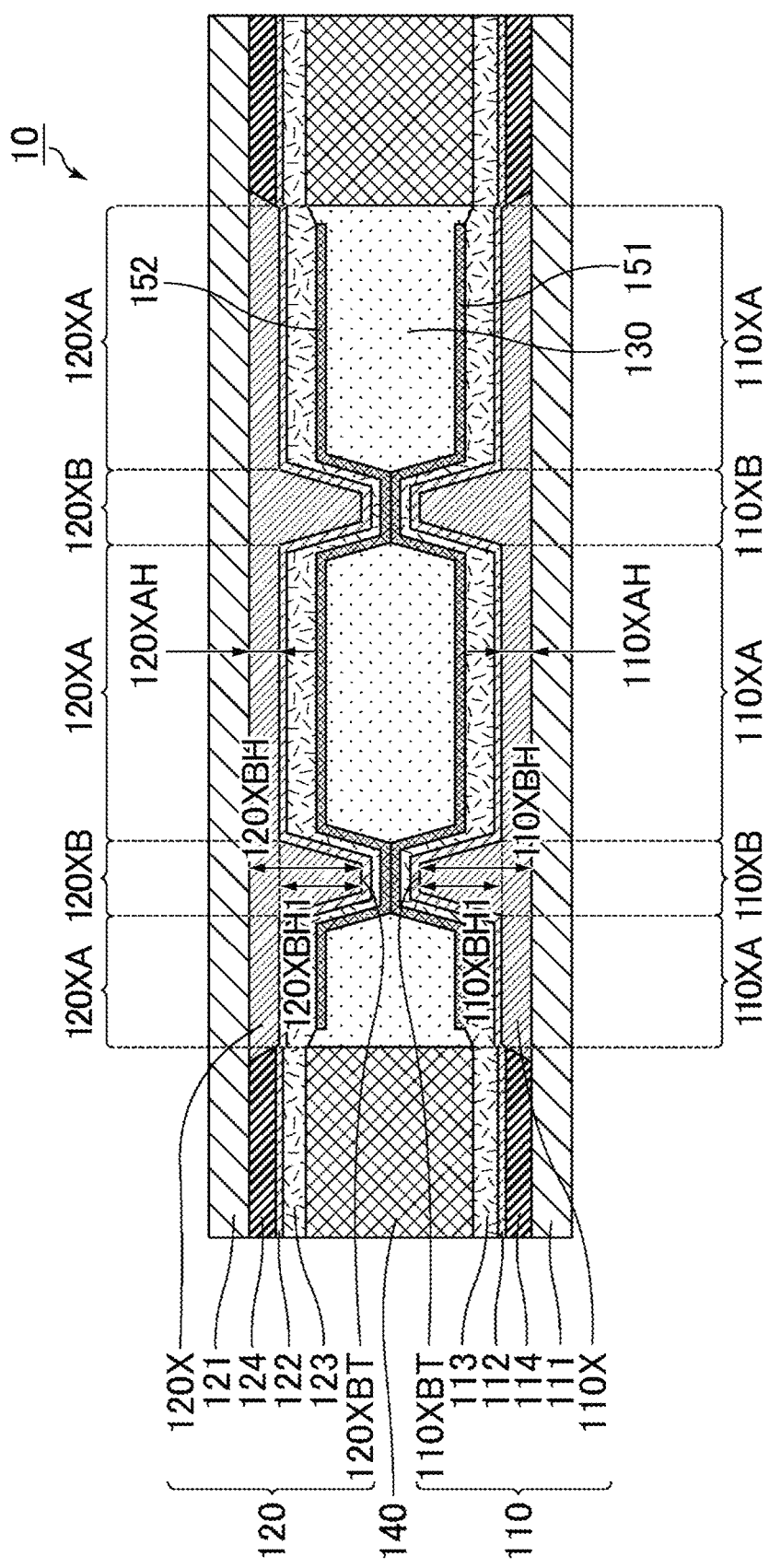
FIG. 4 is a schematic cross-sectional view of a liquid crystal panel according to a second modified example of the first embodiment.

FIG. 4 is a schematic cross-sectional view of a liquid crystal panel according to a second modified example of the first embodiment. As illustrated in FIG. 4, the second substrate-side insulating layer 120X of the present modified example includes a third thickness portion 120XA having a flat surface on the liquid crystal layer 130 side, and a fourth thickness portion 120XB protruding to the liquid crystal layer 130 side relative to the third thickness portion 120XA, and the fourth thickness portion 120XB is the protrusion described above. According to such an aspect as well, it is possible to suppress white unevenness in the display region 10AA near the frame region 10NA and to suppress vertical streak unevenness.

The fourth thickness portion 120XB of the present modified example is the protrusion described above. That is, the second thickness portion 110XB is disposed to face the fourth thickness portion 120XB. The fourth thickness portion 120XB serves as the spacer 120A in the first embodiment.

The second substrate-side insulating layer 120X includes the third thickness portion 120XA having a flat surface on the liquid crystal layer 130 side, and the fourth thickness portion 120XB protruding to the liquid crystal layer 130 side relative to the third thickness portion 120XA.

The shape of the fourth thickness portion 120XB is not particularly limited, but the fourth thickness portion 120XB may be formed in, for example, a truncated cone shape, a cylindrical shape, a truncated pyramid shape, or a prism shape. The fourth thickness portion 120XB is preferably formed in a truncated cone shape. The shape of the fourth thickness portion 120XB refers to the shape of a portion of the fourth thickness portion 120XB protruding to the liquid crystal layer 130 side relative to the third thickness portion 120XA.

The second substrate-side insulating layer 120X may be a single layer or a layered body of a plurality of layers, but is preferably a single layer. For example, as a case where the second substrate-side insulating layer 120X is formed of two layers, the following configuration may be exemplified. That is, the third thickness portion 120XA and a portion of the fourth thickness portion 120XB disposed on an extension line of the third thickness portion 120XA may be formed of a single layer, and a portion of the fourth thickness portion 120XB protruding to the liquid crystal layer 130 side relative to the third thickness portion 120XA may be formed of a layer different from the single layer mentioned above.

As the second substrate-side insulating layer 120X, an organic insulating layer may be used, for example. Examples of the organic insulating layer may include organic films such as an acrylic resin, polyimide resin and novolac resin, and layered bodies thereof.

As the second substrate-side insulating layer 120X, the same organic insulating layer as that of the first substrate-side insulating layer 110X may be used.

The surface on the liquid crystal layer 130 side of the third thickness portion 120XA is flat. With the aspect described above, it is possible to reduce the influence of waviness of the substrate surface generated at the time of manufacturing the second support substrate 121, on the liquid crystal layer 130. As a result, the unevenness in thickness of the liquid crystal layer 130 can be suppressed, and when the liquid crystal panel 10 of the present embodiment is used as an active retarder, vertical streak unevenness can be suppressed. The third thickness portion 120XA is similar to the first thickness portion 110XA.

The third thickness portion 120XA is provided such that the total thickness of the glass substrate inner side in the display region 10AA is equal to the total thickness of the glass substrate inner side in the frame region 10NA. Such an aspect makes it possible to suppress a difference between the cell thickness in the display region 10AA near the frame region 10NA and the cell thickness in the display region 10AA at a location away from the frame region 10NA. As a result, when the liquid crystal panel 10 of the present embodiment is used as an active retarder, it is possible to suppress white unevenness in the display region 10AA near the frame region 10NA, and enhance the performance of the active retarder. The fourth thickness portion 120XB is similar to the second thickness portion 110XB.

The fourth thickness portion 120XB protrudes to the liquid crystal layer 130 side relative to the third thickness portion 120XA. A height 120XBH (thickness) of the fourth thickness portion 120XB is preferably more than 1.0 time and not more than 3.5 times, more preferably not less than 1.1 times and not more than 3.2 times, and still more preferably not less than 1.2 times and not more than 2.8 times a height 120XAH of the third thickness portion 120XA.

For example, it is preferable that the height 120XAH of the third thickness portion 120XA be in a range from 360 nm to 560 nm, and the height 120XBH of the fourth thickness portion 120XB be in a range from 1100 nm to 1400 nm, it is more preferable that the height 120XAH of the third thickness portion 120XA be in a range from 410 nm to 510 nm, and the height 120XBH of the fourth thickness portion 120XB be in a range from 1150 nm to 1350 nm, and it is further preferable that the height 120XAH of the third thickness portion 120XA be in a range from 450 nm to 470 nm, and the height 120XBH of the fourth thickness portion 120XB be in a range from 1200 nm to 1300 nm.

The height 120XAH of the third thickness portion 120XA refers to a distance from a surface of the third thickness portion 120XA on the second support substrate 121 side to a surface thereof on the first substrate 110 side. The height 120XBH of the fourth thickness portion 120XB refers to a distance from a surface of the fourth thickness portion 120XB on the second support substrate 121 side to a surface thereof on the first substrate 110 side.

The second thickness portion 110XB is disposed to face the fourth thickness portion 120XB as the protrusion discussed above. In a plan view, it is preferable that the entirety of a surface 120XBT of the fourth thickness portion 120XB facing the first substrate 110 overlap with the entire surface 110XBT of the second thickness portion 110XB facing the second substrate 120. With the above aspect, the surface 110XBT of the second thickness portion 110XB can be comprehensively disposed with respect to the surface 120AT of the spacer 120A facing the first substrate 110, and thus the cell thickness can be more effectively defined.

The second thickness portion 110XB is preferably in contact with the fourth thickness portion 120XB serving as the protrusion. To be more specific, in a normal state in which no load is applied to the liquid crystal panel 10, it is preferable for a top portion of the second thickness portion 110XB (surface 110XBT on the second substrate 120 side) to be in contact with a top portion of the fourth thickness portion 120XB (surface 120XBT on the first substrate 110 side). With such an aspect, a distance between the first substrate 110 and the second substrate 120 (cell thickness) can be defined. The fourth thickness portion 120XB described above functions as a main spacer.

The total sum of the height 110XBH1 of a portion of the second thickness portion 110XB protruding to the liquid crystal layer 130 side relative to the first thickness portion 110XA and a height 120XBH1 of a portion of the fourth thickness portion 120XB protruding to the liquid crystal layer 130 side relative to the third thickness portion 120XA is preferably equal to the thickness of the liquid crystal layer 130 (cell thickness (e.g., 1.62 μm)). With the aspect described above, the cell thickness may be more effectively defined. In this case, the height 120XBH1 of the protruding portion is a difference between the height 120XBH of the fourth thickness portion 120XB and the height 120XAH of the third thickness portion 120XA.

Since the first substrate 110 and the second substrate 120 of the present modified example can have the same structure, the number of manufacturing processes and the number of masks can be reduced. Since the liquid crystal panel 10 of the present modified example does not have a sub-spacer, this liquid crystal panel 10 is preferably used in applications in which pressure is unlikely to be applied to the surface of the liquid crystal panel.

Second Embodiment

In the present embodiment, features unique to the present embodiment will be mainly described, and a description of contents overlapping the above-described first embodiment will be omitted. In the present embodiment, a three-dimensional display device provided with the liquid crystal panel according to the first embodiment will be described.

Figure 5:
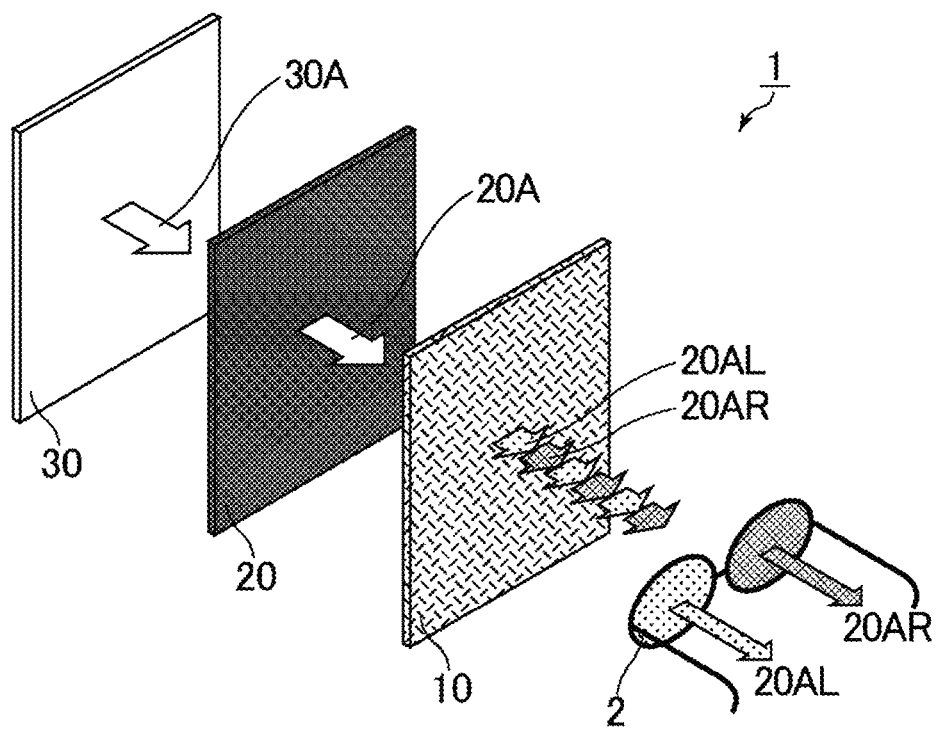
FIG. 5 is an exploded schematic view illustrating a polarization state of a three-dimensional display device according to a second embodiment.

FIG. 5 is an exploded schematic view illustrating a polarization state of a three-dimensional display device according to the second embodiment. As illustrated in FIG. 5, a three-dimensional display device 1 of the present embodiment includes a display panel 20, a liquid crystal panel 10, and polarized glasses 2 in order toward the side of a viewer U. The liquid crystal panel 10 functions as an active retarder. The display panel 20 is also referred to as a main panel. The polarized glasses 2 are also referred to as 3D glasses.

The display panel 20 displays an image 20A. The image 20A includes a right-eye image 20AR and a left-eye image 20AL. The display panel 20 has a function to sequentially display the right-eye image 20AR and the left-eye image 20AL by switching the images at predetermined time intervals.

The liquid crystal panel 10 is an optical switching element synchronized with the image switching of the display panel 20, and has a function to differentiate the polarization states of the right-eye image 20AR and the left-eye image 20AL. For example, when the right-eye image 20AR is incident on the liquid crystal panel 10, the right-eye image 20AR is converted into one of right handed circularly-polarized light and left handed circularly-polarized light, and when the left-eye image 20AL is incident on the liquid crystal panel 10, the left-eye image 20AL is converted into the other one of right handed circularly-polarized light and left handed circularly-polarized light.

The polarized glasses 2 are designed in such a manner that the polarized light of the right-eye image 20AR passes through the right-eye side and the polarized light of the left-eye image 20AL passes through the left-eye side. With such an aspect, the viewer can obtain 3D display.

Figure 6:
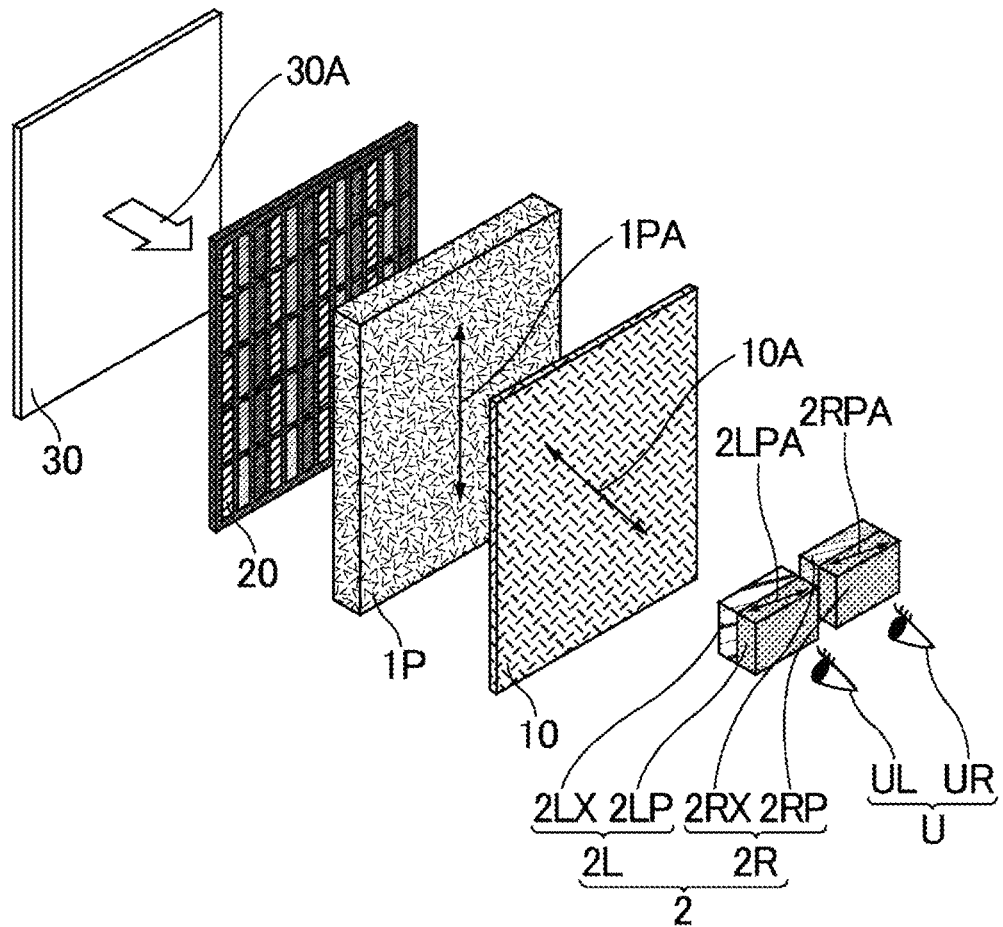
FIG. 6 is an exploded schematic view illustrating an axial azimuthal direction of a three-dimensional display device according to the second embodiment.

FIG. 6 is an exploded schematic view illustrating an axial azimuthal direction of the three-dimensional display device according to the second embodiment. The three-dimensional display device 1 according to the present embodiment will be described in more detail with reference to FIG. 6. The three-dimensional display device 1 of the present embodiment includes the display panel 20, a polarizer 1P having a transmission axis 1PA, the liquid crystal panel 10, and the polarized glasses 2 in order toward a viewer U side. With such an aspect, it is possible to achieve three-dimensional display while suppressing white unevenness in a display region near a frame region, and vertical streak unevenness in the display region.

The polarized glasses 2 include a right-eye lens 2R corresponding to the right eye UR of the viewer U and a left-eye lens 2L corresponding to the left eye UL of the viewer U. The right-eye lens 2R includes a right-eye retarder 2RX and a right-eye polarizer 2RP having a right-eye transmission axis 2RPA. The left-eye lens 2L includes a left-eye retarder 2LX and a left-eye polarizer 2LP having a left-eye transmission axis 2LPA. The term "polarizer" as used herein means a linear polarizer unless otherwise specified.

The right-eye transmission axis 2RPA and the left-eye transmission axis 2LPA are parallel to each other. The transmission axis 1PA is orthogonal to the right-eye transmission axis 2RPA and the left-eye transmission axis 2LPA. One of the right-eye retarder 2RX and the left-eye retarder 2LX is a $-\lambda/4$ retarder, and the other one is a $+\lambda/4$ retarder. Specifically, the transmission axis 1PA is arranged in the vertical direction of the display panel 20, the right-eye transmission axis 2RPA and the left-eye transmission axis 2LPA are arranged in the horizontal direction of the display panel 20, the right-eye retarder 2RX is a $+\lambda/4$ retarder, and the left-eye retarder 2LX is a $-\lambda/4$ retarder.

An angle formed between a slow axis 10A of the liquid crystal panel 10 and the transmission axis 1PA is preferably in a range from 40° to 50°, more preferably in a range from 43° to 47°, and particularly preferably 45°.

The display panel 20 displays the image 20A including the right-eye image 20AR and the left-eye image 20AL. The image 20A from the display panel 20 becomes linearly polarized light in the vertical direction by passing through the polarizer 1P, and is emitted to the liquid crystal panel 10. The display panel 20 sequentially displays the right-eye image 20AR and the left-eye image 20AL by switching at predetermined time intervals.

When the image 20A displayed on the display panel 20 is the right-eye image 20AR, the liquid crystal panel 10 gives the same phase difference (e.g., $+\lambda/4$) as that of the right-eye retarder 2RX to the light incident on the liquid crystal panel 10. When the image 20A displayed on the display panel 20 is the left-eye image 20AL, the liquid crystal panel 10 gives the same phase difference (e.g., $-\lambda/4$) as that of the left-eye retarder 2LX to the light incident on the liquid crystal panel 10. As described above, the phase difference of the liquid crystal panel 10 is switched between $+\lambda/4$ and $-\lambda/4$.

When a phase difference of the liquid crystal panel 10 is $+\lambda/4$, the light in which a phase difference of $+\lambda/4$ is given by the liquid crystal panel 10 to the image 20A emitted from the display panel 20 (specifically, to the right-eye image 20AR), and a phase difference of $-\lambda/4$ is given by the left-eye retarder 2LX is incident on the left eye UL of the viewer U. That is, the total change in the phase difference is represented by an expression of $(+\lambda/4)+(-\lambda/4)=0$. Since the transmission axis 1PA and the left-eye transmission axis 2LPA are orthogonal to each other, the light from the display panel 20 (right-eye image 20AR) cannot pass through the left-eye polarizer 2LP, and the left-eye lens 2L becomes non light-transmissive. On the other hand, the light in which a phase difference of $+\lambda/4$ is given by the liquid crystal panel 10 to the image 20A emitted from the display panel 20 (specifically, to the right-eye image 20AR), and a phase difference of $+\lambda/4$ is given by the right-eye retarder 2RX is incident on the right eye UR of the viewer U. That is, the total change in the phase difference is represented by an expression of $(+\lambda/4)+(+)/4)=+\lambda/2$. Since the transmission axis 1PA and the right-eye transmission axis 2RPA are orthogonal to each other, the light from the display panel 20 (right-eye image 20AR) can pass through the right-eye polarizer 2RP, and the right-eye lens 2R becomes light-transmissive.

Likewise, when a phase difference of the liquid crystal panel 10 is $-\lambda/4$, the light in which a phase difference of $-\lambda/4$ is given by the liquid crystal panel 10 to the image 20A emitted from the display panel 20 (specifically, to the left-eye image 20AL), and a phase difference of $-\lambda/4$ is given by the left-eye retarder 2LX is incident on the left eye UL of the viewer U. That is, the total change in the phase difference is represented by an expression of $(-\lambda/4)+(-\lambda/4)=-\lambda/2$. Since the transmission axis 1PA and the left-eye transmission axis 2LPA are orthogonal to each other, the light from the display panel 20 (left-eye image 20AL) can pass through the left-eye polarizer 2LP, and the left-eye lens 2L becomes light-transmissive. On the other hand, the light in which a phase difference of $-\lambda/4$ is given by the liquid crystal panel 10 to the image 20A emitted from the display panel 20 (specifically, to the left-eye image 20AL), and a phase difference of $+\lambda/4$ is given by the right-eye retarder 2RX is incident on the right eye UR of the viewer U. That is, the total change in the phase difference is represented by an expression of $(-\lambda/4)+(+\lambda/4)=0$. Since the transmission axis 1PA and the right-eye transmission axis 2RPA are orthogonal to each other, the light from the display panel 20 (left-eye image 20AL) cannot pass through the right-eye polarizer 2RP, and the right-eye lens 2R becomes non light-transmissive.

The display panel 20 may be a liquid crystal display panel including a liquid crystal layer and a color filter layer. In this case, the three-dimensional display device 1 is provided with a backlight 30 on the opposite side to the liquid crystal panel 10 of the display panel 20. The backlight 30 has a function to emit backlight light 30A toward the display panel 20. The backlight 30 is provided on the opposite side to the viewer U of the display panel 20.

Figure 7:
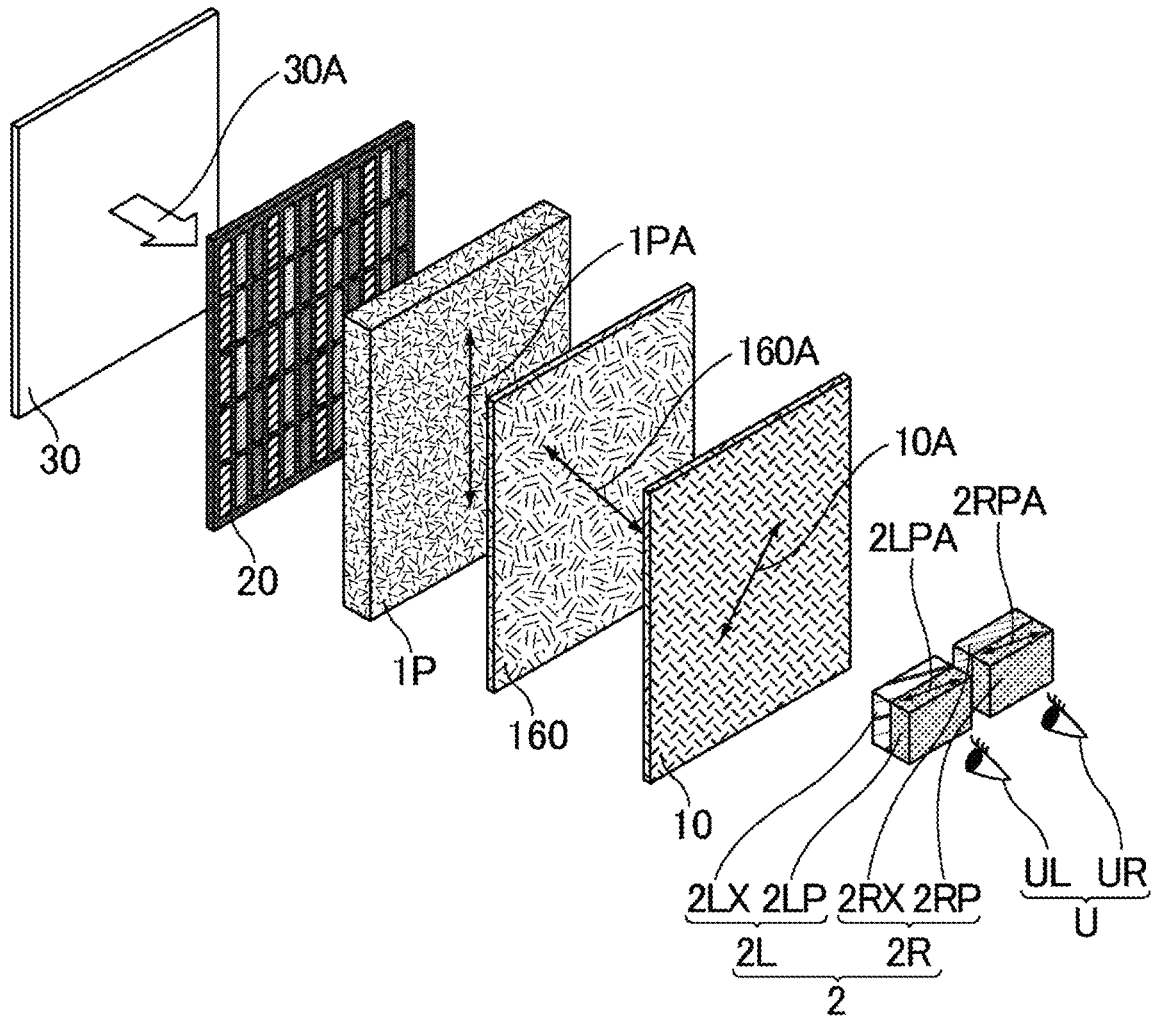
FIG. 7 is a schematic view illustrating an example of a three-dimensional display device according to the second embodiment.

FIG. 7 is a schematic view illustrating an example of the three-dimensional display device according to the second embodiment. As illustrated in FIG. 7, the three-dimensional display device 1 of the present embodiment may include a $\lambda/4$ retarder 160 between the polarizer 1P and the liquid crystal panel 10. The liquid crystal panel 10 is able to switch the phase difference between $\lambda/2$ and 0 nm, and the slow axis 10A of the liquid crystal panel 10 is orthogonal to a slow axis 160A of the $\lambda/4$ retarder 160. That is, the $\lambda/4$ retarder 160 gives a phase difference of $-\lambda/4$. The slow axis of the liquid crystal panel is a slow axis of a liquid crystal layer included in the liquid crystal panel.

For example, when a phase difference of the liquid crystal panel 10 in a voltage non-applied state is $\lambda/2$, the light emitted from the display panel 20 passes through the $\lambda/4$ retarder 160 and the liquid crystal panel 10 to be given a phase difference of $\lambda/4$. As a result, the left-eye lens 2L becomes non light-transmissive while the right-eye lens 2R becomes light-transmissive. On the other hand, when a phase difference of the liquid crystal panel 10 in a voltage applied state is 0 nm, the light emitted from the display panel 20 passes through the $\lambda/4$ retarder 160 and the liquid crystal panel 10 to be given a phase difference of $-\lambda/4$. As a result, the left-eye lens 2L becomes light-transmissive while the right-eye lens 2R becomes non light-transmissive.

More specifically, the liquid crystal panel 10 designed to have a phase difference of $\lambda/2$ in a state where an applied voltage is Low (voltage non-applied state) has a slow axis in the x-axis direction. Therefore, since a relation of nx>ny holds in the liquid crystal panel 10, a phase difference of the liquid crystal panel 10 is represented by an expression of $(nx-ny) \times \text{thickness} = +\lambda/2$.

On the other hand, the $\lambda/4$ retarder 160 having a slow axis in the y-axis direction can also be said to be a $\lambda/4$ retarder having a fast axis in the x-axis direction. Therefore, since a relation of nx<ny holds in the $\lambda/4$ retarder 160, a phase difference of the $\lambda/4$ retarder 160 is represented by an expression of $(nx-ny) \times \text{thickness} = -\lambda/4$.

As described above, the total value of the phase differences of the liquid crystal panel 10 and the λ/4 retarder 160 in the voltage non-applied state is represented by an expression of (+λ/2)+ (−λ/4)=+λ/4. Since the sign is +, the slow axis is parallel to the x-axis direction and the absolute value of the phase difference is λ/4.

The state in which the voltage applied to the liquid crystal panel 10 is Low has been described thus far, but the phase difference of the liquid crystal panel 10 becomes 0 in a state in which the applied voltage is High (voltage applied state) (the phase difference does not become completely 0, but is assumed to be 0 here to simplify the description). Therefore, the total value of the phase differences of the liquid crystal panel 10 and the λ/4 retarder 160 in the voltage applied state is represented by an expression of (0)+ (−λ/4)=−λ/4. Since the sign is -, the slow axis is parallel to the y-axis direction and the absolute value of the phase difference is λ/4.

First Modified Example of Second Embodiment

Figure 8:
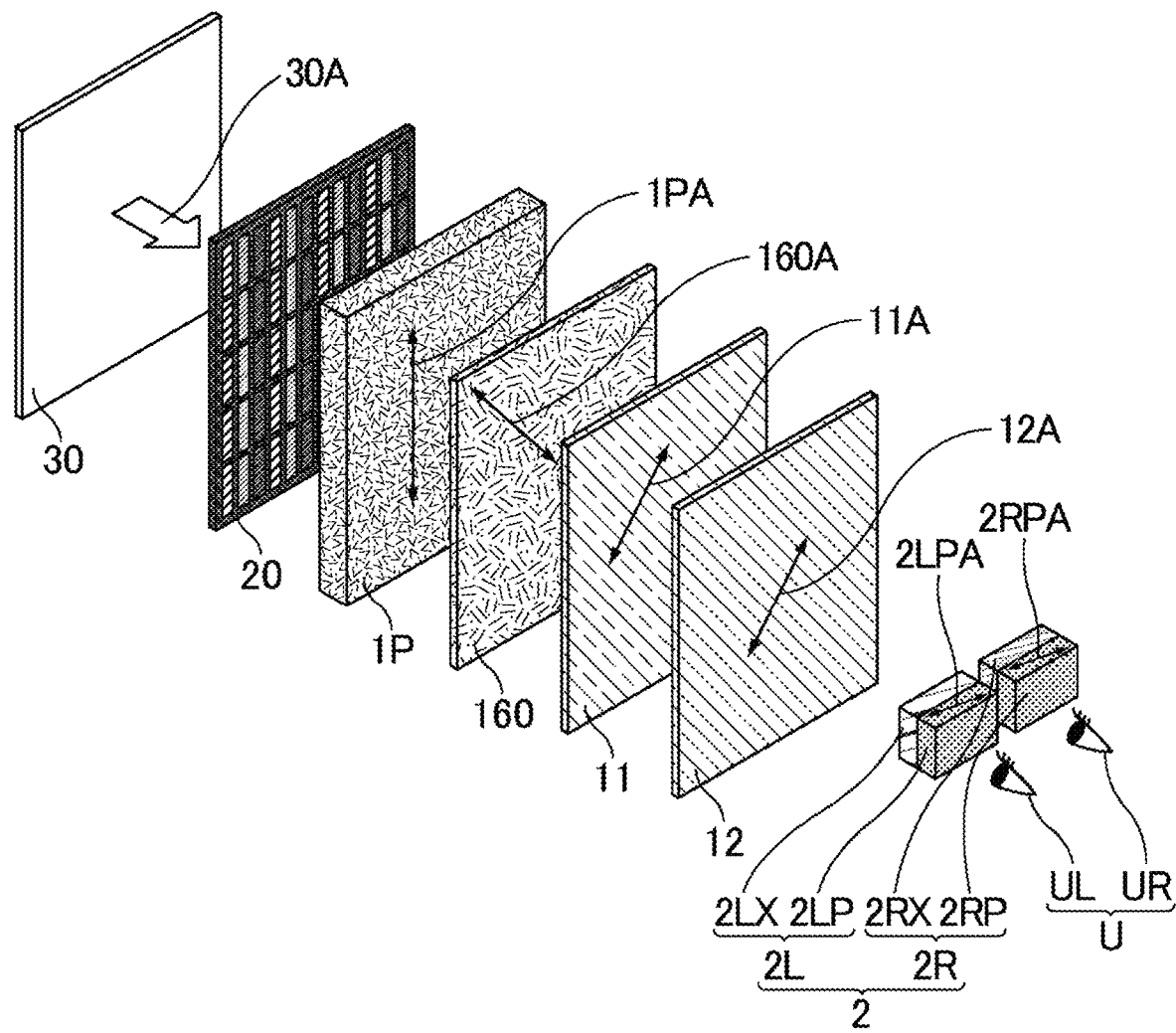
FIG. 8 is a schematic view illustrating an example of a three-dimensional display device according to a first modified example of the second embodiment.

FIG. 8 is a schematic view illustrating an example of a three-dimensional display device according to a first modified example of the second embodiment. As illustrated in FIG. 8, a three-dimensional display device 1 of the present modified example includes the display panel 20, the polarizer 1P having the transmission axis 1PA, a first liquid crystal panel 11, a second liquid crystal panel 12, and the polarized glasses 2 in order toward the viewer U side. With such an aspect, it is possible to achieve three-dimensional display while suppressing white unevenness in the display region near the frame region, and vertical streak unevenness in the display region.

The three-dimensional display device 1 of the present modified example is the same as the three-dimensional display device 1 of the second embodiment except that the number of liquid crystal panels is different. That is, the three-dimensional display device 1 of the second embodiment includes one liquid crystal panel 10, and this liquid crystal panel 10 can switch the phase difference between λ/2 and 0 nm. On the other hand, the three-dimensional display device 1 of the present modified example includes two liquid crystal panels 11 and 12, and each of the liquid crystal panels 11 and 12 can switch the phase difference between λ/4 and 0 nm. As described above, in the present modified example, the phase difference of the liquid crystal panel 10 in the second embodiment is divided to the two liquid crystal panels 11 and 12.

The three-dimensional display device 1 of the present modified example may include the λ/4 retarder 160 between the polarizer 1P and the first liquid crystal panel 11. Each of the first liquid crystal panel 11 and the second liquid crystal panel 12 can switch the phase difference between λ/4 and 0 nm, a slow axis 11A of the first liquid crystal panel 11 is orthogonal to the slow axis 160A of the λ/4 retarder 160, and a slow axis 12A of the second liquid crystal panel 12 is orthogonal to the slow axis 160A of the λ/4 retarder 160. That is, the λ/4 retarder 160 gives a phase difference of −λ/4. Note that the slow axis 10A of the liquid crystal panel 10 is a slow axis of the liquid crystal layer 130 included in the liquid crystal panel 10.

For example, when a phase difference of the first liquid crystal panel 11 in the voltage non-applied state is λ/4 and a phase difference of the second liquid crystal panel 12 in the voltage non-applied state is λ/4, the light emitted from the display panel 20 passes through the λ/4 retarder 160, the first liquid crystal panel 11, and the second liquid crystal panel 12 to be given a phase difference of λ/4. As a result, the left-eye lens 2L becomes non light-transmissive while the right-eye lens 2R becomes light-transmissive. On the other hand, when a phase difference of the first liquid crystal panel 11 in the voltage applied state is 0 nm and a phase difference of the second liquid crystal panel 12 in the voltage applied state is 0 nm, the light emitted from the display panel 20 passes through the λ/4 retarder 160, the first liquid crystal panel 11, and the second liquid crystal panel 12 to be given a phase difference of −λ/4. As a result, the left-eye lens 2L becomes light-transmissive while the right-eye lens 2R becomes non light-transmissive.

The effects of the disclosure will be described below with reference to the examples and comparative examples, but the disclosure is not limited by these examples.

First Example

The liquid crystal panel 10 corresponding to the above-described first embodiment was prepared. First, the first substrate 110 was prepared as follows. An insulating layer for cell thickness adjustment (first substrate-side insulating layer 110X) having two thicknesses, the first transparent conductive film 112, an insulating layer for preventing vertical leakage (first insulating layer 113) were formed on a glass substrate (first support substrate 111) having a thickness of 0.5 mm.

The material of the insulating layer for cell thickness adjustment (the first substrate-side insulating layer 110X) was a transparent organic film and had two thicknesses (the first thickness portion 110XA and the second thickness portion 110XB). Specifically, a flat organic insulating layer of 920 nm was provided as the insulating layer for cell thickness adjustment between the first support substrate 111 and the first transparent conductive film 112 to form the first thickness portion 110XA. Further, a truncated cone having a height of 300 nm was provided at a position which was located on the first thickness portion 110XA with a thickness of 920 nm, and at which the truncated cone was set to the same location as the main spacer (spacer 120A) when the substrate main surface was seen in a plan view, whereby the second thickness portion 110XB was formed. That is, the height 110XAH of the first thickness portion 110XA was 920 nm, the height 110XBH of the second thickness portion 110XB was 1220 nm, and the height 110XBH1 of the protruding portion was 300 nm. The diameter of the upper face of the truncated cone (the surface 110XBT of the second thickness portion 110XB facing the second substrate 120) was 20 μm, which was larger than the diameter of the top portion of the main spacer (the surface 120AT on the first substrate 110 side of the spacer 120A) included in the second substrate 120.

The material of the first transparent conductive film 112 was IZO and the thickness thereof was 70 nm. The material of the insulating layer for preventing vertical leakage (first insulating layer 113) was SiN, and the thickness thereof was 530 nm.

The screen size was a 27-type, the effective display region was 581.8176 mm in the horizontal direction and 333.7992 mm in the vertical direction. The electrode structure was such that the transparent conductive film (first transparent conductive film 112) was divided into two segments at the center in the vertical direction.

The second substrate 120 was prepared in the following manner. The second transparent conductive film 122, an insulating layer for preventing vertical leakage (the second insulating layer 123), and spacers (the spacer 120A as the main spacer and the sub-spacer 120B) were formed on a glass substrate (the second support substrate 121) having a thickness of 0.5 mm.

The material of the second transparent conductive film 122 was IZO, and the thickness thereof was 140 nm. The material of the insulating layer for preventing vertical leakage (second insulating layer 123) was SiN, and the thickness thereof was 680 nm.

The spacer 120A serving as the main spacer had a cylindrical shape, the diameter of a bottom face of the spacer 120A (the surface 120AT on the first substrate 110 side of the spacer 120A and a surface on the second support substrate 121 side thereof) was 15.3 µm, and the height 120AH was 1.32 µm. The sub-spacer 120B had a quadrangular prism shape, where the bottom face thereof had a length of 15 µm in the vertical direction and a length of 40 µm in the horizontal direction, and the height thereof was 1.32 µm. Each of the spacer 120A and the sub-spacer 120B was formed of a transparent organic film.

An alignment film material was applied on the surface on the first insulating layer 113 side of the first substrate 110 prepared as described above to form the first alignment film 151, and an alignment film material was applied on the surface on the spacer 120A side of the second substrate 120 to form the second alignment film 152. Then, drawing was performed with a sealing resin in the frame region 10NA of the second substrate 120. Further, a liquid crystal material was dropped onto the first alignment film 151, and the first substrate 110 and the second substrate 120 were bonded to each other in such a manner that the first alignment film 151 and the second alignment film 152 face each other. Thereafter, the sealing resin was cured by performing UV exposure and heating to form the sealing portion 140. The thickness of the liquid crystal layer (cell thickness) was 1.62 µm.

The alignment film material included polyimide for horizontal alignment. The thicknesses of the first alignment film 151 and the second alignment film 152 were each 90 nm. The first alignment film 151 and the second alignment film 152 were subjected to anti-parallel rubbing treatment. The dielectric anisotropy of the liquid crystal material was positive, and Δn was 0.16.

A signal of the second substrate 120 is input from an input terminal for the upper substrate (first metal layer 114) included in the first substrate 110 through conductive beads for sealing included in the sealing portion 140. Due to this, the sealing resin contained conductive beads for sealing (diameter: 3 µm) for electrically connecting the first substrate 110 and the second substrate 120 and also contained a spacer for sealing (diameter: 2 µm) serving as a column of the sealing portion 140, and they were uniformly mixed. The finished height of the sealing resin, that is, the height of the sealing portion 140 was 2000 nm. The thicknesses of the first metal layer 114 and the second metal layer 124 were each 360 nm.

In the first example, the total sum of the height 110XBH1 (300 nm) of the portion of the second thickness portion 110XB protruding to the liquid crystal layer 130 side relative to the first thickness portion 110XA and the height 120AH (1.32 µm) of the spacer 120A serving as the protrusion was equal to the thickness of the liquid crystal layer 130 (1.62 µm).

In a plan view, the entire surface 120AT of the spacer 120A facing the first substrate 110 was included inside the surface 110XBT of the second thickness portion 110XB facing the second substrate 120.

First Comparative Example

The liquid crystal panel 10R according to the above-described comparative embodiment was prepared. To be specific, a liquid crystal panel 10R of a first comparative example was prepared in the same manner as in the first example except that the first substrate-side insulating layer 110X was not provided in the first substrate 110 and the height of the spacer 120AR as a main spacer was set to be 1.62 µm.

Figure 9:
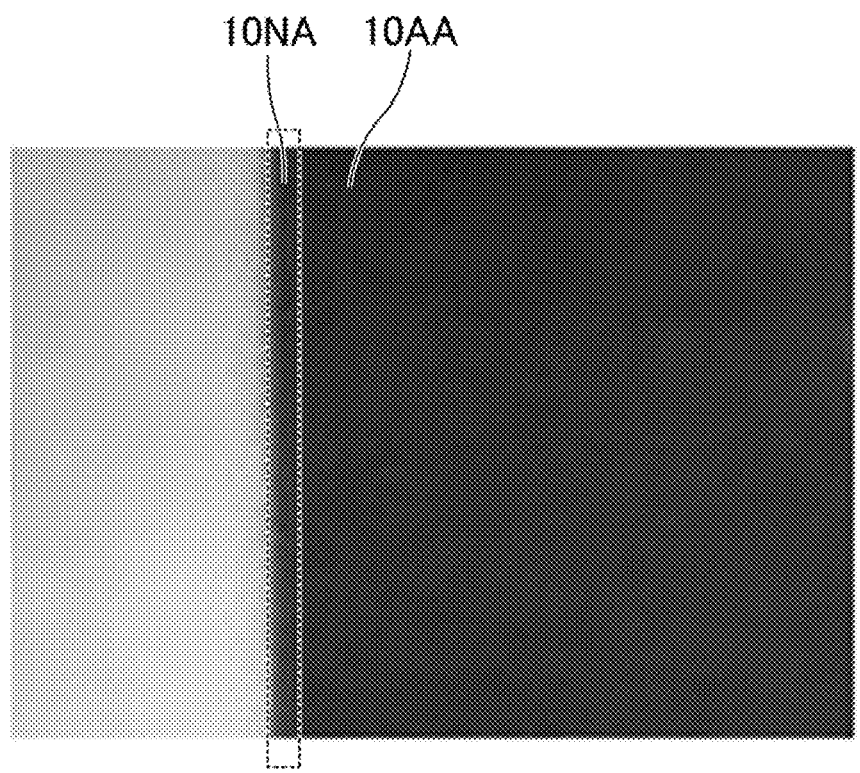
FIG. 9 is a photograph showing a non-lighting black display state of a liquid crystal panel according to a first example.
Figure 10:
FIG. 10 is a photograph showing a non-lighting black display state of a liquid crystal panel according to a first comparative example.
Figure 11:
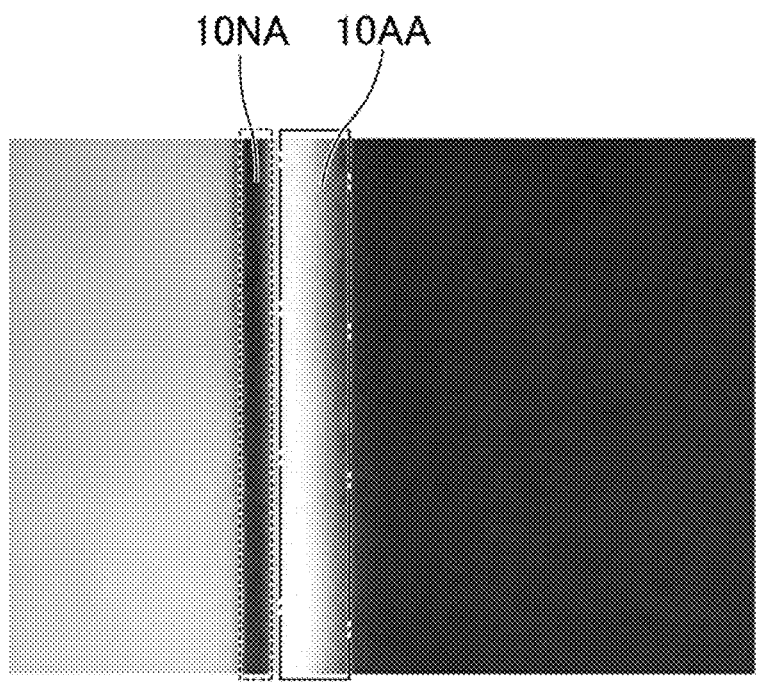
FIG. 11 is an enlarged photograph of a region surrounded by a broken line in FIG. 10.

Evaluation of White Unevenness of Liquid Crystal Panels According to First Example and First Comparative Example The liquid crystal panel 10 of the first example and the liquid crystal panel 10R of the first comparative example were compared in a non-lighting black display state. FIG. 9 is a photograph showing a non-lighting black display state of the liquid crystal panel according to the first example. FIG. 10 is a photograph showing a non-lighting black display state of the liquid crystal panel according to the first comparative example. FIG. 11 is an enlarged photograph of a region surrounded by a broken line in FIG. 10.

As shown in FIG. 9, in the liquid crystal panel 10 of the first example, white unevenness in the display region 10AA near the frame region 10NA (sealing portion 140) was suppressed. In the liquid crystal panel 10 of the first example, it is conceivable that, since the optimum cell thickness (1.62 µm) was obtained both in the vicinity of the sealing portion 140 and at the center of the cell, uniform black display was managed to be achieved. Note that the inside of a broken line depicted in FIG. 9 is the frame region 10NA. Since the metal layer was disposed therein, light was not transmitted and the frame region 10NA became black.

On the other hand, in the liquid crystal panel 10R of the first comparative example, as indicated by a dot-dash line in FIG. 11, white unevenness occurred in the display region 10AA near the frame region 10NA (sealing portion 140). In the liquid crystal panel 10R of the first comparative example, the optimum cell thickness at the cell center was 1.62 µm, whereas the cell thickness near the sealing portion 140 was approximately 2.0 µm. Thus, it is conceivable that the retardation near the sealing portion 140 was higher than the desired retardation and the white unevenness occurred. As described above, in the portion near the frame region 10NA of the first comparative example, the retardation required for display performance of the 3D active retarder cannot be obtained, and thus the portion mentioned above cannot be used for display. The inside of a broken line depicted in FIG. 11 is the frame region 10NA. Since the metal layer was disposed therein, light was not transmitted and the frame region 10NA became black.

Figure 12:
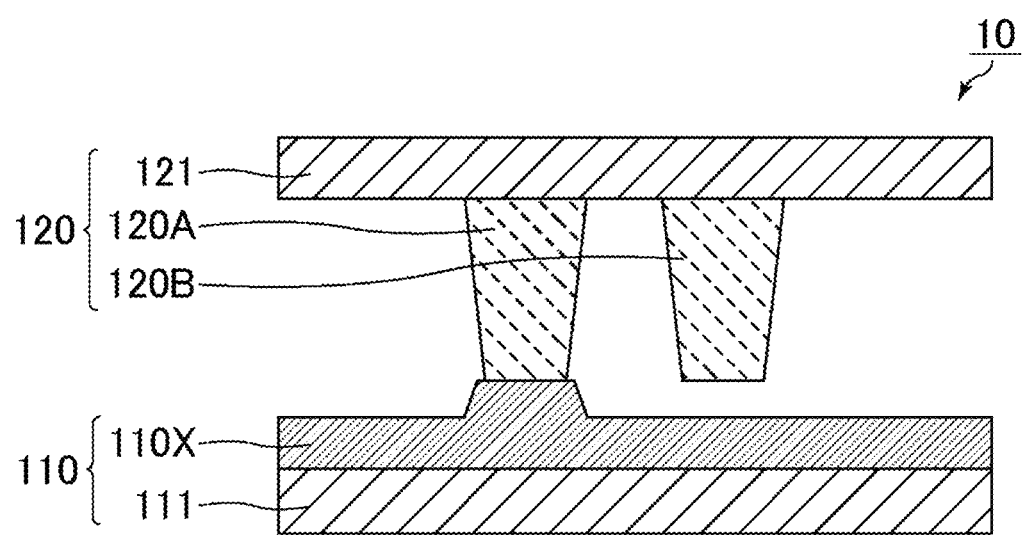
FIG. 12 is a schematic cross-sectional view illustrating a main spacer and a sub-spacer of a liquid crystal panel according to the first example.
Figure 13:
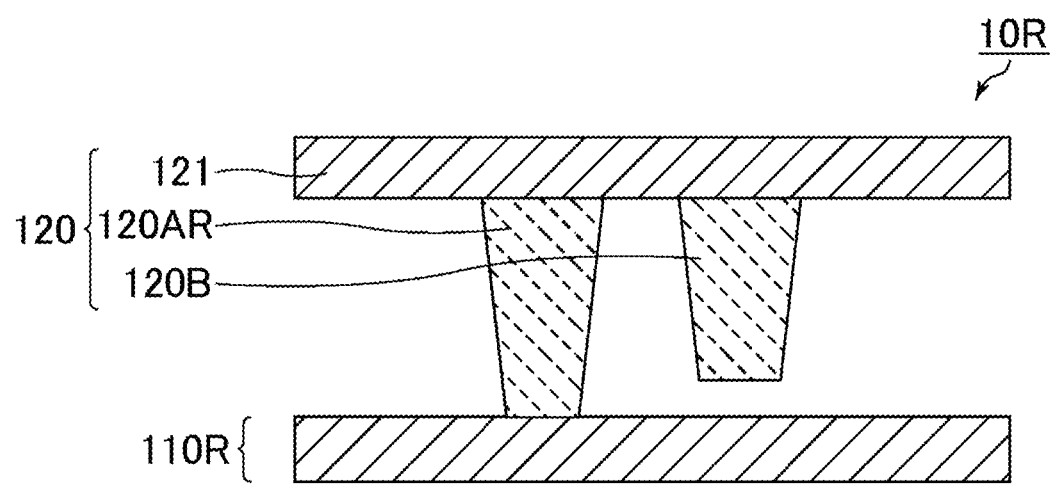
FIG. 13 is a schematic cross-sectional view illustrating a main spacer and a sub-spacer of a liquid crystal panel according to the first comparative example.

Evaluation of Manufacturing Processes of Liquid Crystal Panels According to First Example and First Comparative Example FIG. 12 is a schematic cross-sectional view illustrating a main spacer and a sub-spacer of the liquid crystal panel according to the first example. FIG. 13 is a schematic cross-sectional view illustrating a main spacer and a sub-spacer of the liquid crystal panel according to the first comparative example. As illustrated in FIG. 12, in the liquid crystal panel 10 of the first example, since the height of the spacer 120A as a main spacer and the height of the sub-spacer 120B are the same, the main spacer and the sub-spacer can be collectively formed. On the other hand, in the liquid crystal panel 10R of the first comparative example, as illustrated in FIG. 13, since the height of the spacer 120AR serving as a main spacer and the height of the sub-spacer 120B are different from each other, in order to form the spacer 120AR and the sub-spacer 120B, it is necessary to divide the process into two process stages of forming the spacer 120AR and forming the sub-spacer 120B, or to collectively form the spacer 120AR and the sub-spacer 120B by using half exposure.

In general liquid crystal panel applications, the height of the spacer is set to be 2.0 to 3.0 µm. On the other hand, in the liquid crystal panel 10R of the first comparative example used as an active retarder, the height of the spacer 120AR is set to be 1.62 µm and the height of the sub-spacer 120B is set to be 1.32 µm. The heights of the spacer 120AR and the sub-spacer 120B are lower than the heights of the spacers of general liquid crystal panels. Because of this, high accuracy is required for the process of forming the spacer 120AR and the sub-spacer 120B of the first comparative example, and it is considered that the process mentioned above is difficult to be carried out.

Figure 14:
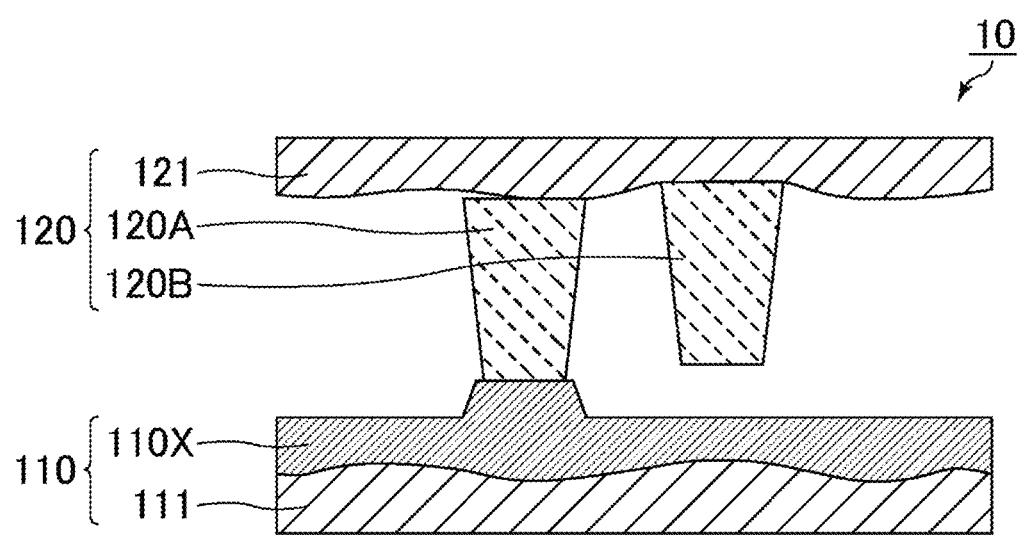
FIG. 14 is an example of a schematic cross-sectional view of a liquid crystal panel according to the first example.
Figure 15:
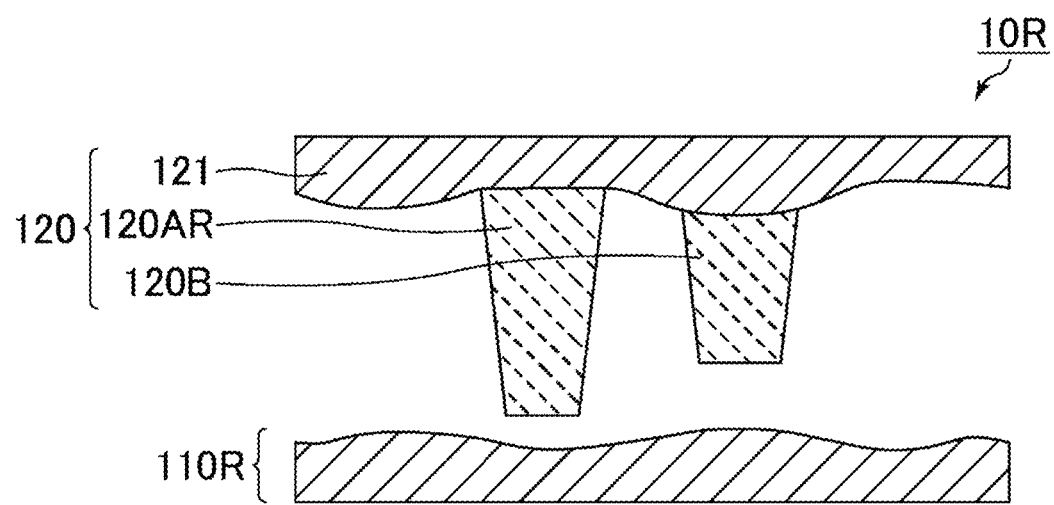
FIG. 15 is an example of a schematic cross-sectional view of a liquid crystal panel according to the first comparative example.
Figure 16:
FIG. 16 is a photograph showing vertical streak unevenness of a liquid crystal panel according to the first comparative example.

Evaluation of Vertical Streak Unevenness of Liquid Crystal Panels According to First Example and First Comparative Example FIG. 14 is an example of a schematic cross-sectional view of the liquid crystal panel according to the first example. FIG. 15 is an example of a schematic cross-sectional view of the liquid crystal panel according to the first comparative example. FIG. 16 is a photograph showing vertical streak unevenness of the liquid crystal panel according to the first comparative example.

In the liquid crystal panel 10 of the first example, no vertical streak unevenness was observed. On the other hand, in the liquid crystal panel 10R of the first comparative example, as shown in FIG. 16, vertical streak unevenness occurred at a pitch of approximately 20 to 30 mm in the display region 10AA.

As illustrated in FIGS. 14 and 15, although the first support substrate 111 and the second support substrate 121, which are glass substrates, are leveled with high accuracy in the glass manufacturing process, waviness with a height of 0.1 µm or less occurs at a pitch of 5 to 30 mm on the first support substrate 111 and the second support substrate 121.

In the liquid crystal panel 10R of the first comparative example, as illustrated in FIG. 15, it is conceivable that the waviness of the glass substrates constituting the first support substrate 111 and the second support substrate 121 interfered with each other, then a difference in size of the cell thickness of the liquid crystal layer 130 was generated to cause a difference in retardation, and thus the streak unevenness was visually recognized. That is, it is conceivable that the in-plane cell thickness became non-uniform due to the interference of the waviness of the glass substrates, and the streak unevenness of approximately 20 to 30 mm occurred and was visually recognized.

On the other hand, in the liquid crystal panel 10 of the first example, since the first substrate-side insulating layer 110X was provided on the first support substrate 111, as illustrated in FIG. 14, it is conceivable that the surface of the first substrate 110 was leveled to suppress the interference of the waviness of the glass substrate, and thus the streak unevenness was suppressed.

Evaluation of Pressure Against Liquid Crystal Panels According to First Example and First Comparative Example Even when the surface of the liquid crystal panel 10 of the first example was pressed with a finger, light leakage was unlikely to occur. The liquid crystal panel 10 of the first example includes the first substrate-side insulating layer 110X, and the first substrate-side insulating layer 110X includes the second thickness portion 110XB. Because of this, even when the surface of the liquid crystal panel 10 is pressed with a finger, the tip of the spacer 120A is unlikely to come into contact with a region of the first thickness portion 110XA disposed corresponding to the display region 10AA. As a result, it is conceivable that the first alignment film 151 was unlikely to be damaged, and thus the light leakage due to the damage of the alignment film was unlikely to occur.

Figure 17:
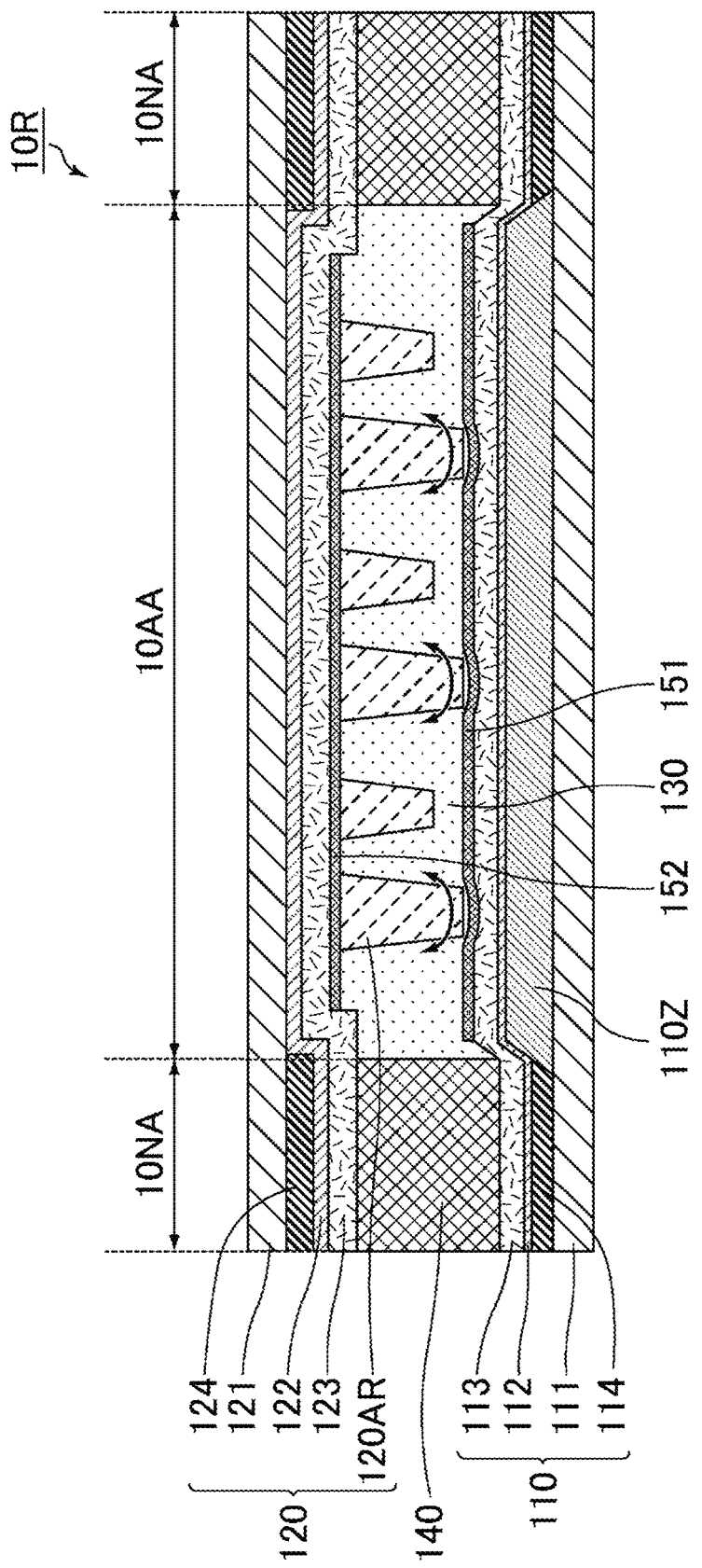
FIG. 17 is a schematic cross-sectional view illustrating a case in which a liquid crystal panel according to the first comparative example is pressed.
Figure 18:
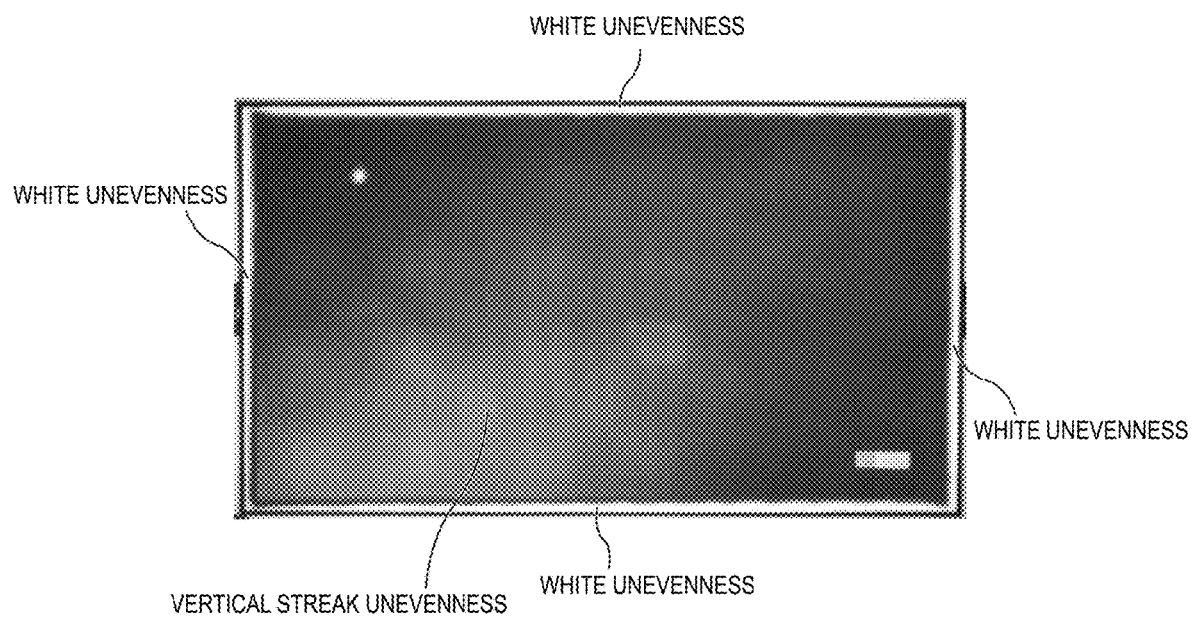
FIG. 18 is a photograph showing display unevenness of a display device according to the comparative embodiment.

FIG. 17 is a schematic cross-sectional view illustrating a case in which the liquid crystal panel according to the first comparative example is pressed. When the surface of the liquid crystal panel 10R of the first comparative example was pressed with a finger, a display defect (specifically, light leakage) occurred. It is conceivable that, when the surface of the liquid crystal panel 10R of the first comparative example was pressed with a finger, the spacer 120AR projected into the display region 10AA, the tip of the spacer 120AR scraped off the first alignment film 151 located in the display region 10AA, or the like, so that the liquid crystal molecules were not aligned as intended and the display defect occurred. In FIG. 17, an insulating layer for cell thickness adjustment 110Z, which is not depicted in the liquid crystal panel 10R according to the comparative embodiment, is depicted. The insulating layer for cell thickness adjustment 110Z was a layer having a flat shape without irregularities.

Second Example

A liquid crystal panel 10 of a second example corresponding to the first modified example of the first embodiment was prepared. Specifically, the liquid crystal panel 10 of the second example was prepared in the same manner as in the first example except that the height of the first thickness portion 110XA was 460 nm, the height of the second thickness portion 110XB was 760 nm, and the second substrate-side insulating layer 120X having a thickness of 460 nm was provided between the second support substrate 121 and the second transparent conductive film 122.

The first substrate-side insulating layer 110X was prepared as follows. A flat organic insulating layer of 460 nm was provided as an insulating layer for cell thickness adjustment between the first support substrate 111 and the first transparent conductive film 112 to form the first thickness portion 110XA. Further, a truncated cone having a height of 300 nm was provided at a position which was located on the first thickness portion 110XA with a thickness of 460 nm, and at which the truncated cone was set in the same location as that of the main spacer (spacer 120A) when the substrate main surface was seen in a plan view, whereby the second thickness portion 110XB was formed. That is, the height 110XAH of the first thickness portion 110XA was 460 nm, the height 110XBH of the second thickness portion 110XB was 760 nm, and the height 110XBH1 of the protruding portion was 300 nm. A flat organic insulating layer of 460 nm was provided as an insulating layer for cell thickness adjustment between the second support substrate 121 and the second transparent conductive film 122 to form the second substrate-side insulating layer 120X.

In the second example, the total sum of the height 110XBH1 (300 nm) of the portion of the second thickness portion 110XB protruding to the liquid crystal layer 130 side relative to the first thickness portion 110XA and the height 120AH (1.32 μm) of the spacer 120A serving as the protrusion was equal to the thickness of the liquid crystal layer 130 (1.62 μm).

In a plan view, the entire surface 120AT of the spacer 120A facing the first substrate 110 was included inside the surface 110XBT of the second thickness portion 110XB facing the second substrate 120.

In the liquid crystal panel 10 of the second example, vertical streak unevenness was more suppressed than in the first example. In the second example, it is conceivable that, by providing the insulating layer for cell thickness adjustment also on the second substrate 120 side, waviness of the glass substrate was managed to be leveled for both the first substrate 110 and the second substrate 120, and the vertical streak unevenness caused by the waviness of the glass substrate was managed to be more suppressed than in the first example.

Third Example

A liquid crystal panel 10 of a third example corresponding to the second modified example of the first embodiment was prepared. To be specific, the liquid crystal panel 10 of the third example was prepared in the same manner as in the first example except that the configurations of the first substrate-side insulating layer 110X and the second substrate-side insulating layer 120X were changed.

The first substrate-side insulating layer 110X was prepared as follows. A flat organic insulating layer of 460 nm was provided as an insulating layer for cell thickness adjustment between the first support substrate 111 and the first transparent conductive film 112 to form the first thickness portion 110XA. Further, a truncated cone having a height of 810 nm was provided on the first thickness portion 110XA with a thickness of 460 nm, whereby the second thickness portion 110XB was formed. That is, the height 110XAH of the first thickness portion 110XA was 460 nm, the height 110XBH of the second thickness portion 110XB was 1270 nm, and the height 110XBH1 of the protruding portion was 810 nm.

The second substrate-side insulating layer 120X was provided between the second support substrate 121 and the second transparent conductive film 122, similarly to the first substrate-side insulating layer 110X. That is, the height 120XAH of the third thickness portion 120XA was 460 nm, the height 120XBH of the fourth thickness portion 120XB was 1270 nm, and the height 120XBH1 of the protruding portion was 810 nm.

The first substrate 110 and the second substrate 120 were bonded to each other in such a manner that the fourth thickness portion 120XB included in the second substrate-side insulating layer 120X serving as the insulating layer for cell thickness adjustment of the second substrate 120 overlapped with the second thickness portion 110XB included in the first substrate-side insulating layer 110X serving as the insulating layer for cell thickness adjustment of the first substrate 110 when the first substrate 110 and the second substrate 120 were seen in a plan view. In the present embodiment, the fourth thickness portion 120XB (more specifically, a second protruding portion 120XB2) functions as the spacer 120A in the first example.

In the third example, the total sum of the height 110XBH1 (810 nm) of a portion of the second thickness portion 110XB protruding to the liquid crystal layer 130 side relative to the first thickness portion 110XA and the height 120XBH1 (810 nm) of a portion of the fourth thickness portion 120XB protruding to the liquid crystal layer 130 side relative to the third thickness portion 120XA was equal to the thickness of the liquid crystal layer 130 (1.62 μm).

In a plan view, the entire surface 120XBT of the fourth thickness portion 120XB facing the first substrate 110 overlapped with the entire surface 110XBT of the second thickness portion 110XB facing the second substrate 120.

In the liquid crystal panel 10 of the third example, vertical streak unevenness was more suppressed than in the first example, as in the second example. In the third example, it is conceivable that, by providing the insulating layer for cell thickness adjustment also on the second substrate 120 side, waviness of the glass substrate was managed to be leveled for both the first substrate 110 and the second substrate 120, and the vertical streak unevenness caused by the waviness of the glass substrate was managed to be more suppressed than in the first example.

Since the first substrate 110 and the second substrate 120 had the same structure, the liquid crystal panel 10 of the third example was able to reduce the number of manufacturing processes and the number of masks as compared to the second example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A liquid crystal panel provided with a display region and a frame region disposed around the display region, the liquid crystal panel comprising:
    a first substrate and a second substrate disposed facing the first substrate,
    wherein in the display region, a liquid crystal layer is disposed between the first substrate and the second substrate,
    in the frame region, a sealing portion is disposed between the first substrate and the second substrate,
    the first substrate includes a first support substrate and a first substrate-side insulating layer contacting the first support substrate in order toward the liquid crystal layer side,
    the second substrate includes a protrusion protruding to the liquid crystal layer side, and
    the first substrate-side insulating layer includes a first thickness portion having a flat surface on the liquid crystal layer side, and a second thickness portion protruding to the liquid crystal layer side relative to the first thickness portion and disposed to face the protrusion.

2. The liquid crystal panel according to claim 1,
    wherein the second thickness portion has a truncated cone shape.

3. The liquid crystal panel according to claim 1,
    wherein a total sum of a height of a portion of the second thickness portion protruding to the liquid crystal layer side relative to the first thickness portion and a height of the protrusion is equal to a thickness of the liquid crystal layer.

4. The liquid crystal panel according to claim 1, wherein an entire surface of the protrusion facing the first substrate is included inside a surface of the second thickness portion facing the second substrate in a plan view.

5. The liquid crystal panel according to claim 1, wherein the second substrate includes a second support substrate and a second substrate-side insulating layer contacting the second support substrate in order toward the liquid crystal layer side.

6. The liquid crystal panel according to claim 5, wherein the second substrate-side insulating layer includes a third thickness portion having a flat surface on the liquid crystal layer side, and a fourth thickness portion protruding to the liquid crystal layer side relative to the third thickness portion, and the fourth thickness portion is the protrusion mentioned above.

7. The liquid crystal panel according to claim 1, wherein the first substrate further includes a first transparent conductive film disposed on the liquid crystal layer side of the first substrate-side insulating layer, and a first insulating layer disposed on the liquid crystal layer side of the first transparent conductive film.

8. The liquid crystal panel according to claim 1, wherein the second substrate includes a second support substrate, a second transparent conductive film disposed on the liquid crystal layer side of the second support substrate, and a second insulating layer disposed on the liquid crystal layer side of the second transparent conductive film.

9. The liquid crystal panel according to claim 1, wherein an edge of the first substrate-side insulating layer has a slope portion.

10. The liquid crystal panel according to claim 7, wherein the first substrate further includes a metal layer between the first support substrate and the first transparent conductive film in the frame region.

11. The liquid crystal panel according to claim 10, wherein the metal layer is in contact with an edge of the first substrate-side insulating layer.

12. The liquid crystal panel according to claim 10, wherein an edge of the first substrate-side insulating layer has a slope portion, and the metal layer is in contact with the slope portion.

13. A three-dimensional display device, comprising in order toward a viewer side:
a display panel;
a polarizer having a transmission axis;
the liquid crystal panel according to claim 1 as an active retarder; and
polarized glasses.

14. The three-dimensional display device according to claim 13, further comprising:
a $\lambda/4$ retarder between the polarizer and the liquid crystal panel,
wherein the liquid crystal panel is able to switch a phase difference between $\lambda/2$ and 0 nm, and
a slow axis of the liquid crystal panel is orthogonal to a slow axis of the $\lambda/4$ retarder.

15. A three-dimensional display device, comprising in order toward a viewer side:
a display panel;
a polarizer having a transmission axis;
a first liquid crystal panel made of the liquid crystal panel according to claim 1 as an active retarder;
a second liquid crystal panel made of the liquid crystal panel according to claim 1 as an active retarder; and
polarized glasses.

16. The three-dimensional display device according to claim 15, further comprising:
a $\lambda/4$ retarder between the polarizer and the first liquid crystal panel,
wherein the first liquid crystal panel and the second liquid crystal panel are each able to switch a phase difference between $\lambda/4$ and 0 nm,
a slow axis of the first liquid crystal panel is orthogonal to a slow axis of the $\lambda/4$ retarder, and
a slow axis of the second liquid crystal panel is orthogonal to the slow axis of the $\lambda/4$ retarder.

* * * * *